United States Patent
Krigslund et al.

(10) Patent No.: US 9,860,022 B2
(45) Date of Patent: Jan. 2, 2018

(54) METHOD, APPARATUS, AND PROTOCOL FOR IMPROVING PERFORMANCE IN A WIRELESS NETWORK

(71) Applicant: Aalborg Universitet, Aalborg (DK)

(72) Inventors: Jeppe Krigslund, Skanderborg (DK); Jonas Hansen, Holstebro (DK); Martin Hundebøll, Aarhus C (DE); Daniel E. Lucani, Aalborg øst (DK); Frank H. P. Fitzek, Aalborg (DE)

(73) Assignee: Aalborg Universitet, Aalborg (DK)

( * ) Notice: Subject to any disclaimer, the term of this patent is extended or adjusted under 35 U.S.C. 154(b) by 0 days.

(21) Appl. No.: 14/647,611

(22) PCT Filed: Feb. 27, 2014

(86) PCT No.: PCT/US2014/018933
§ 371 (c)(1),
(2) Date: May 27, 2015

(87) PCT Pub. No.: WO2013/134276
PCT Pub. Date: Sep. 4, 2014

(65) Prior Publication Data
US 2015/0358118 A1 Dec. 10, 2015

Related U.S. Application Data

(60) Provisional application No. 61/770,541, filed on Feb. 28, 2013.

(51) Int. Cl.
*H04W 40/02* (2009.01)
*H04L 12/701* (2013.01)
(Continued)

(52) U.S. Cl.
CPC ............ *H04L 1/0076* (2013.01); *H04L 45/24* (2013.01); *H04W 28/021* (2013.01); *H04W 40/02* (2013.01); *H04L 2001/0097* (2013.01)

(58) Field of Classification Search
None
See application file for complete search history.

(56) References Cited

U.S. PATENT DOCUMENTS 7,408,938 B1 * 8/2008 Chou ..................... H04H 20/42
370/394
2005/0232183 A1 10/2005 Sartori et al.
(Continued)

FOREIGN PATENT DOCUMENTS

WO WO 2010/025362 A2 3/2010

OTHER PUBLICATIONS

Katti, et al.; "XORs in the Air: Practical Wireless Network Coding;" IEEE/ACM Transactions on Networking; vol. 16; Issue 4; Jun. 2008; 14 pages.
(Continued)

*Primary Examiner* — Duc Duong
(74) *Attorney, Agent, or Firm* — Daly, Crowley, Mofford & Durkee, LLP

(57) ABSTRACT

A wireless network protocol (CORE) and related methods, systems, and circuits are disclosed that are capable of enhancing network performance. The protocol uses random linear network coding (RLNC) for intra-session coding in the network, while allowing nodes in the network to set up inter-session coding regions where flows intersect. Within the inter-session coding regions, combinations of coded packets associated with different unicast sessions are permitted. However, packets associated with multiple different unicast sessions are not allowed to be transmitted outside of the coding regions.

26 Claims, 9 Drawing Sheets

(51) Int. Cl.
H04L 1/00 (2006.01)
H04W 28/02 (2009.01)
H04L 12/707 (2013.01)

(56) References Cited

U.S. PATENT DOCUMENTS

| | | | |
|---|---|---|---|
| 2008/0130521 A1* | 6/2008 | Li | H04W 16/225 370/254 |
| 2008/0219251 A1 | 9/2008 | Xue et al. | |
| 2008/0267106 A1* | 10/2008 | Buddhikot | H04L 45/16 370/312 |
| 2009/0323580 A1* | 12/2009 | Xue | H04B 7/15521 370/315 |
| 2010/0046371 A1 | 2/2010 | Sundararajan et al. | |
| 2010/0226243 A1* | 9/2010 | Lee | H04L 1/1819 370/216 |
| 2011/0164621 A1 | 7/2011 | Lee et al. | |
| 2012/0155531 A1 | 6/2012 | Yi et al. | |
| 2012/0188934 A1 | 7/2012 | Liu et al. | |
| 2012/0250494 A1 | 10/2012 | Rong et al. | |
| 2013/0051377 A1* | 2/2013 | Seferoglu | H04W 28/0236 370/338 |
| 2013/0107764 A1* | 5/2013 | Zeger | H04L 5/16 370/280 |
| 2013/0148563 A1* | 6/2013 | Brueck | H04W 4/06 370/312 |
| 2013/0170433 A1* | 7/2013 | Summerson | H04W 28/065 370/328 |
| 2014/0064296 A1* | 3/2014 | Haeupler | H04L 49/90 370/412 |
| 2014/0241404 A1* | 8/2014 | Liew | H04W 72/1231 375/211 |
| 2015/0181559 A1* | 6/2015 | Medard | H04B 7/15521 370/312 |
| 2016/0021599 A1 | 1/2016 | Fitzek et al. | |

OTHER PUBLICATIONS

Zhao, et. al; "On analyzing and improving COPE performance;" Information Theory and Applications Workshop (ITA); Jan. 31-Feb. 5, 2010; 6 pages.
PCT Search Report of the ISA for PCT/2014/018933 dated Jun. 20, 2014.
Written Opinion of the ISA for PCT/2014/018933 dated Jun. 20, 2014.
Extended European Search Report dated Aug. 4, 2016 corresponding to European Application No. 14756767.1; 12 Pages.
Chi et al., "A More Efficient COPE Architecture for Network Coding in Multihop Wireless Networks;" XP-001547522; Paper from the Institute of Electronics, Information and Communication Engineers (IEICE)—Transactions on Communications, vol. E92-B, No. 3; Mar. 2009; pp. 766-775; 10 Pages.
Hansen et al., "Bridging Inter-flow and Intra-flow Network Coding for Video Applications: Testbed Description and Performance Evaluation;" Proceedings of the 18th IEEE International Workshop on Computer Aided Modeling and Design of Communication Links and Networks (CAMAD); Sep. 25-27, 2013; 6 Pages.
PCT Search Report and Written Opinion dated Sep. 11, 2014; for PCT Appl. No. PCT/US14/24450; 12 pages.
U.S. National Stage Patent Application filed Sep. 11, 2015; U.S. Appl. No. 14/775,102, 32 pages.
PCT International Preliminary Report on Patentability dated Sep. 24, 2015; For PCT App. No. PCT/US2014/024450; 9 pages.
PCT International Preliminary Report dated Sep. 11, 2015 corresponding to International Application No. PCT/US2014/018933; 8 Pages.
Hundebøll, et al.; "CATWOMAN: Implementation and Performance Evaluation of IEEE 802.11 based Multi-Hop Networks using Network Coding;" IEEE 76th Vehicular Tech. Conf. (VTC), Quebec City, Canada, Sep. 2012.
Neuman, et al.; "Better approach to mobile ad-hoc networking," in IETF Internet Draft., Apr. 7, 2008.
Seferoglu, et al.; "NCAPQ: Network Coding-Aware Priority Queueing for UPD Flows over COPE;" Int. Symp. on Network Coding (NetCod), Jul. 2011, pp. 1-8.
Seferoglu, et al.; "Network Coding-Aware Queue Management for TCP Flows over Coded Wireless Networks;" IEEE/ACM Transactions on Networking; vol. 22; No. 4, Aug. 2014; pp. 1297-1310.
Zhu, et al.; "C&M: A New Network Coding Scheme for Wireless Networks;" IEEE 2009 Fifth International Conference on Information Assurance and Security; Aug. 2009; pp. 432-436.
PCT European Search Report dated Oct. 17, 2016, from European Appl. No. 14774611.9, 9 pages.
Kokalj-Filipovic et al, "Doped Fountain Coding for Minimum Delay Data Collection in Circular Networks", from Arxiv.Org, Cornell University Online Library; Jan. 21, 2010; 45 pages.
Pahlevani et al, "PlayNCool: Opportunistic Network Coding for Local Optimization of Routing in Wireless Mesh Networks" from Globecom 2013 Workshop—First International Workshop on Cloud-Processing in Heterogeneous Mobile Communication Networks, Dec. 13, 2013; 6 pages.
Pahlevani et al, "Network Coding to Enhance Standard Routing Protocols in Wireless Mesh Networks" from Globecom 2013 Workshop—International Workshop on Device-to-Device (D2D) Communication With and Without Infrastructure, Dec. 13, 2013; 7 pages.
Response (with Amended Claims and Specifications) to European Office Action dated Aug. 23, 2016 for European Application No. 14756767.1; Response filed on Mar. 1, 2017; 16 Pages.
U.S. Non-Final Office Action dated Apr. 10, 2017 for U.S. Appl. No. 14/775,102; 35 Pages.
Response to Extended European Search Report for EP Appl. No. 14774611.9 dated Oct. 17, 2016 as filed on Apr. 27, 2017; 11 pages.
Response to U.S. Office Action dated Apr. 10, 2017 for U.S. Appl. No. 14/775,102, filed Jul. 7, 2017; 18 pages.

* cited by examiner $$\begin{matrix} \text{First two} \\ \text{transmissions:} \\ \text{Failed overhearing} \end{matrix} \left\{ \begin{bmatrix} \alpha_{11}^{(1)} & \alpha_{12}^{(1)} & \alpha_{13}^{(1)} & \alpha_{11}^{(2)} & \alpha_{12}^{(2)} & \alpha_{13}^{(2)} \\ \alpha_{21}^{(1)} & \alpha_{22}^{(1)} & \alpha_{23}^{(1)} & \alpha_{21}^{(2)} & \alpha_{22}^{(2)} & \alpha_{23}^{(2)} \\ \alpha_{31}^{(1)} & \alpha_{32}^{(1)} & \alpha_{33}^{(1)} & 0 & 0 & 0 \\ 0 & 0 & 0 & \alpha_{31}^{(2)} & \alpha_{32}^{(2)} & \alpha_{33}^{(2)} \\ \alpha_{41}^{(1)} & \alpha_{42}^{(1)} & \alpha_{43}^{(1)} & 0 & 0 & 0 \\ 0 & 0 & 0 & \alpha_{41}^{(2)} & \alpha_{42}^{(2)} & \alpha_{43}^{(2)} \end{bmatrix} \right. \begin{bmatrix} P_1^{(1)} \\ P_2^{(1)} \\ P_3^{(1)} \\ P_1^{(2)} \\ P_2^{(2)} \\ P_3^{(2)} \end{bmatrix} \begin{matrix} \left.\vphantom{\begin{matrix}a\\a\\a\end{matrix}}\right\} \text{Flow 1} \\ \left.\vphantom{\begin{matrix}a\\a\\a\end{matrix}}\right\} \text{Flow 2} \end{matrix}$$

$$\begin{matrix} \text{Next two} \\ \text{transmissions:} \\ \text{Successful} \\ \text{overhearing} \end{matrix}$$

(a) The coding coefficients corresponding to receptions at each event sequentially.

$$\begin{matrix} \text{Partial} \\ \text{decoding to} \\ \text{"free" a dof} \\ \text{for flow 1} \end{matrix} \left\{ \begin{bmatrix} \alpha_{31}^{(1)} & \alpha_{32}^{(1)} & \alpha_{33}^{(1)} & 0 & 0 & 0 \\ \alpha_{41}^{(1)} & \alpha_{42}^{(1)} & \alpha_{43}^{(1)} & 0 & 0 & 0 \\ \beta_{11}^{(1)} & \beta_{12}^{(1)} & \beta_{13}^{(1)} & 0 & 0 & 0 \\ \beta_{21}^{(1)} & \beta_{22}^{(1)} & \beta_{23}^{(1)} & 0 & 0 & 0 \\ 0 & 0 & 0 & \beta_{31}^{(2)} & 1 & 0 \\ 0 & 0 & 0 & \beta_{41}^{(2)} & \beta_{42}^{(2)} & 1 \end{bmatrix} \right. \begin{bmatrix} P_1^{(1)} \\ P_2^{(1)} \\ P_3^{(1)} \\ P_1^{(2)} \\ P_2^{(2)} \\ P_3^{(2)} \end{bmatrix}$$

(b) Only partial decoding is needed to recover linear combinations with contribution limited to flow 1.

*FIG. 3*

METHOD, APPARATUS, AND PROTOCOL FOR IMPROVING PERFORMANCE IN A WIRELESS NETWORK

This application is a U.S. National Stage of PCT application PCT/US2014/018933 filed in the English language on Feb. 27, 2014, and entitled "Method, Apparatus, and Protocol for Improving Performance In A Wireless Network;" which claims the benefit under 35 U.S.C. §119 of provisional application No. 61/770,541 filed Feb. 28, 2013, which application is hereby incorporated herein by reference in its entirety.

FIELD

The subject matter described herein relates generally to wireless communication and more particularly to coding techniques and protocols for use in wireless mesh and ad hoc networks.

BACKGROUND

Wireless mesh networks are key enablers for a variety of applications, ranging from large scale sensing and mobile cloud services to city-wide Internet connectivity during disaster scenarios. However, limitations on the wireless spectrum assigned to specific applications limits the scalability of wireless networks. Techniques and protocols are therefore needed that are capable of increasing the throughput and spectral efficiency of such networks.

SUMMARY

The present disclosure relates to techniques, systems, and protocols for implementing network coding in wireless networks in a manner that is capable of enhancing throughput and/or spectral efficiency. Wireless mesh networks implementing network coding have traditionally addressed two problems separately; namely, (1) the problem of providing reliability for a single session and (2) the problem of opportunistic combination of flows using minimalistic coding (e.g., exclusive-ORing (XORing) packets from different flows). Techniques, protocols, and systems are described herein that address these issues in a cooperative manner to achieve enhanced throughput in corresponding networks. A protocol named CORE is proposed that uses random linear network coding (RLNC) for "intra-session" coding in a network, while allowing nodes in the network to set up "inter-session" coding regions where flows intersect. Under the protocol, routes for unicast sessions are agnostic to other sessions and may be set up beforehand. The protocol may then discover and exploit intersecting routes in the network.

The inter-session coding regions in the network are allowed to leverage RLNC to compensate for losses or failures in the overhearing or transmitting processes. Thus, the benefits of XORing are increased by exploiting the underlying RLNC structure of individual flows. This capability provides benefits that go beyond providing additional reliability to individual sessions or exploiting coding opportunistically. Numerical results have shown that CORE outperforms both forwarding and COPE-like schemes in general. In one investigated topology, CORE provided gains of up to 4x over COPE-like schemes in terms of transmissions per packet.

In accordance with one aspect of the concepts, systems, circuits, and techniques described herein, a machine implemented method comprises: determining routes through a wireless network for different unicast sessions; analyzing routes in the wireless network for the different unicast sessions to identify inter-session coding regions in the network, each inter-session coding region including at least one wireless relay node that is associated with multiple unicast sessions; combining network coded packets associated with multiple unicast sessions within the wireless relay nodes of the inter-session coding regions and transmitting the resulting combined packets from the wireless relay nodes to other nodes within the corresponding inter-session coding regions; and within a first node of a first inter-session coding region: (i) over hearing and storing transmissions of other nodes within the first inter-session coding region that are associated with different unicast sessions than the first node; (ii) using combined network coded packets received from a first relay node of the first inter-session coding region and overheard transmissions stored in the first node to generate a coded packet that is associated with a single specific unicast session; and (iii) transmitting the coded packet that is associated with the single unicast session from the first node to a node outside the first inter-session coding region.

In one embodiment, determining routes through the wireless network for different unicast sessions is performed without coordination between the unicast sessions.

In one embodiment, the method further comprises combining network coded packets associated with the same unicast session within wireless nodes both inside and outside of the inter-session coding regions and transmitting the resulting combined packets to other nodes in the network.

In one embodiment, combining network coded packets associated with multiple unicast sessions within the wireless relay nodes of the inter-session coding regions includes exclusive-ORing (XORing) random linear network coding (RLNC) packets associated with different unicast sessions.

In one embodiment, combining network coded packets associated with multiple unicast sessions within the wireless relay nodes of the inter-session coding regions includes, for the first relay node of the first inter-session coding region: (i) determining whether a new RLNC packet has been received by the first relay node for each of a plurality of unicast sessions associated with the first relay node; (ii) if new RLNC packets have been received by the first relay node for each of the plurality of unicast sessions, XORing the new RLNC packets together; and (iii) if a new RLNC packet has not been received by the first relay node for one of the plurality of unicast sessions, generating an RLNC packet for the unicast session using data from a local buffer and then XORing the new RLNC packet(s) with the generated RLNC packet.

In one embodiment, using combined network coded packets received from the first relay node of the first inter-session coding region and overheard transmissions stored in the first node to generate a coded packet that is associated with a single unicast session includes performing partial decoding of a combined network coded packet to remove effects of all unicast sessions other than the single specific unicast session.

In one embodiment, each unicast session in the network has an associated network coding generation size indicative of the number of data packets that are combined together in each network coded packet of the unicast session; and the method further comprises: (i) sending a feedback message from a relay node of an inter-session coding region of the network to an upstream node transmitting network coded packets associated with a first unicast session to the relay node in response to receipt of a sufficient number of degrees of freedom from the upstream node to enable reliable decoding of a present generation of the first unicast session; and (ii) ceasing transmission of network coded packets associated with the current generation of the first unicast session from the upstream node in response to the feedback message.

In one embodiment, the wireless network is a wireless mesh network.

In one embodiment, the method further comprises re-coding the coded packet associated with the single unicast session before transmitting the coded packet from the first node to a node outside the first inter-session coding region.

In one embodiment, determining routes through the wireless network for different unicast sessions includes identifying either a single path or multiple paths through the wireless network for each unicast session.

In one embodiment, the method further comprises coordinating coding activities between different inter-session coding regions that are associated with the same unicast sessions.

In accordance with another aspect of the concepts, systems, circuits, and techniques described herein, a machine implemented method is provided for use in a wireless network that is capable of supporting multiple simultaneous unicast sessions. More specifically, the method comprises: defining a first inter-session coding region in the wireless network that includes a first relay node and a plurality of other nodes in a vicinity of the first relay node, the first relay node being associated with at least two different unicast sessions; receiving new network coded packets at the first relay node for each of the at least two unicast sessions; combining the new network coded packets using an exclusive-OR (XOR) operation to generate a combined packet in the first relay node; and transmitting the combined packet from the first relay node to at least one other node within the first inter-session coding region, wherein an inter-session coding region is a region of a wireless network that allows inter-session packets within the coding region, but nodes within the inter-session coding region cannot transmit inter-session packets to nodes outside the coding region.

In one embodiment, defining a first inter-session coding region in the wireless network includes defining a region having one of the following topologies: an X topology, a cross topology, and an Alice and Bob topology.

In one embodiment, the method further comprises: (i) repeating receiving, combining, and transmitting at the first relay node for a number of iterations; and (ii) if a new network coded packet is not received at the first relay node for one or more of the at least two unicast sessions during receiving for an iteration, generating a network coded packet for the corresponding unicast session(s) using data from a local buffer within the first relay node before combining.

In one embodiment, the method further comprises transmitting a feedback message from the first relay node to an upstream transmitting node associated with a first unicast session if a sufficient number of degrees of freedom have been received at the first relay node to reliably decode a current generation of the first unicast session.

In one embodiment, the method further comprises coordinating coding activities in the first inter-session coding region and another inter-session coding region in the wireless network from the first relay node.

In accordance with still another aspect of the concepts, systems, circuits, and techniques described herein, a machine implemented method is provided for use in a wireless network having a number of inter-session coding regions defined around relay nodes at which routes associated with different unicast sessions intersect. More specifically, the method comprises, at a first node of a first inter-session coding region: (i) over hearing and storing transmissions of other non-relay nodes within the first inter-session coding region that are associated with different unicast sessions than the first node; (ii) receiving combined packets from a relay node of the first inter-session coding region at the first node, the combined packets each including a combination of network coded packets associated with multiple different unicast sessions; (iii) using the combined packets and overheard transmissions stored in the first node to generate a network coded packet that is associated with a single specific unicast session; and (iv) transmitting the network coded packet that is associated with the single unicast session from the first node to a node outside the first inter-session coding region.

In one embodiment, no inter-session coded packets are transmitted from nodes within the first inter-session coding region to nodes outside the first inter-session coding region in the wireless network.

In one embodiment, the combined packets received from the relay node of the first inter-session coding region include a combination of random linear network coding (RLNC) packets associated with different unicast sessions that are exclusive ORed together.

In one embodiment, the method further comprises re-coding the network coded packet associated with the single unicast session before transmitting the network coded packet from the first node to the node outside the first inter-session coding region.

In accordance with a further aspect of the concepts, systems, circuits, and techniques described herein, a communication device for use in a wireless mesh network comprises: a wireless transceiver; digital storage; and circuitry configured to analyze routes associated with different unicast sessions within the wireless mesh network and establish at least one inter-session coding region within the wireless mesh network within which combinations of network coded packets associated with different unicast sessions are permitted, each inter-session coding region including at least one relay node that is associated with multiple unicast sessions in the network and a plurality of other nodes in a vicinity of the at least one relay node, wherein combinations of network coded packets associated with different unicast sessions are not permitted in portions of the wireless mesh network outside of inter-session coding regions.

In one embodiment, the communication device further comprises circuitry configured to, if the communication device is acting as a non-relay node within an inter-session coding region, overhear and store transmissions of other non-relay nodes within the inter-session coding region.

In one embodiment, the communication device further comprises: (i) circuitry configured to, if the communication device is acting as a non-relay node within an inter-session coding region, receive combined packets from a relay node of the inter-session coding region, the combined packets including combinations of network coded packets associated with different unicast sessions; and (ii) circuitry configured to, if the communication device is acting as a non-relay node within an inter-session coding region, process combined packets received from the relay node and overheard transmissions stored in the communication device to generate network coded packets associated with only a single unicast session, wherein the communication device only transmits packets that are associated with a single unicast session to nodes outside of the inter-session coding region.

In one embodiment, the communication device further comprises circuitry configured to, if the communication device is acting as a relay node within an inter-session coding region, receive random linear network coded (RLNC) packets associated with different unicast sessions from other nodes within the inter-session coding region, combine the RLNC packets using an exclusive OR operation, and transmit the combined packet to another node of the inter-session coding region.

In one embodiment, the communication device further comprises circuitry configured to, if the communication device is acting as a relay node within an inter-session coding region and if a new random linear network coded (RLNC) packet is not received for one or more of the different unicast sessions, generate an RLNC packet for the unicast session(s) using data stored locally within the communication device before the RLNC packets are combined.

In one embodiment, the communication device further comprises circuitry configured to, when the communication device is acting as a relay node within an inter-session coding region, send a feedback message to an upstream transmitting node associated with a first unicast session when a sufficient number of degrees of freedom have been received from the upstream node to decode a current RLNC generation.

BRIEF DESCRIPTION OF THE DRAWINGS

The foregoing features may be more fully understood from the following description of the drawings in which:

FIGS. 3a and 3b are diagrams illustrating coding coefficients corresponding to packet receptions in an exemplary CORE implementation;

DETAILED DESCRIPTION

Figure 1:
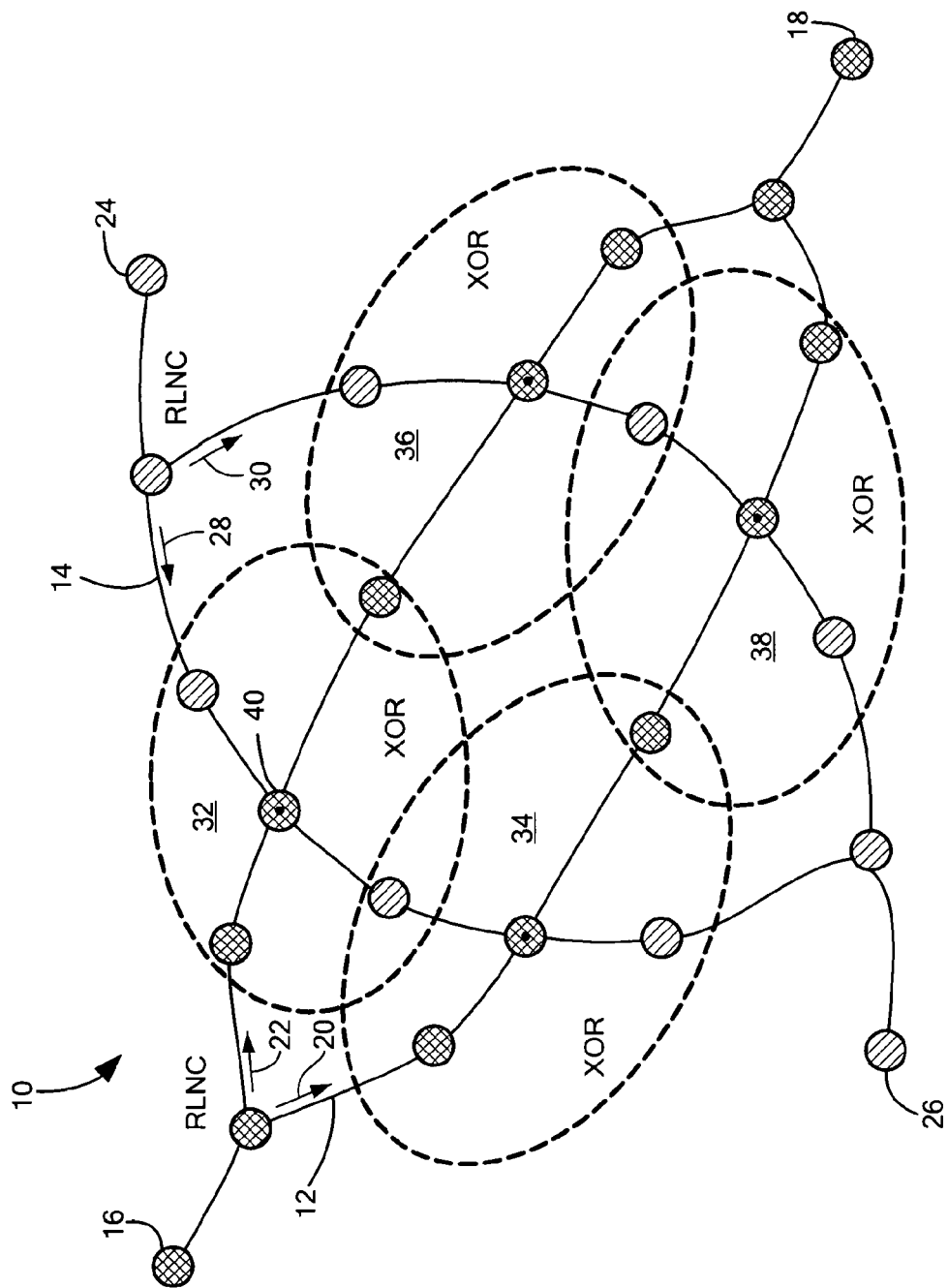
FIG. 1 is a network diagram illustrating an exemplary implementation of a CORE protocol in accordance with an embodiment.

The techniques, devices, systems, circuits, and protocols described herein may be used to enhance performance within wireless mesh networks, wireless ad hoc networks, and other peer-to-peer type wireless networks. As used herein, the term "wireless mesh network" will be used in a broad sense to encompass all types of wireless networks that include some level of peer-to-peer wireless connectivity. Although described primarily in the context of wireless mesh networks, it should be appreciated that some of the techniques, features, and structures described herein may also have application in other types of networks (e.g., wireless infrastructure networks, hybrid networks, wired networks, etc.).

One technique that has shown potential for improving throughput efficiency in a wireless mesh network is network coding. The underlying idea of network coding is that packets or other data elements may be treated as algebraic entities within a network upon which linear operations (e.g., linear combination) may be performed. The resulting linear combinations may then be decoded at a destination node or intermediate node to retrieve the original packets as long as a sufficient number of these linear combinations have been received by the node. The decoding process amounts to a solution of a linear system of equations having the original packets as variables. Previous research has focused on two approaches to exploit network coding in a network: inter-session coding and intra-session coding. Inter-session coding involves the combination of packets from different "flows" (or sessions) in a network. Intra-session coding involves coding between packets of the same flow.

Inter-session coding strategies were inspired by the well-known COPE protocol ["XORs in the Air: Practical Wireless Network Coding," by Katti et al, *IEEE/ACM Trans. on Net.*, vol. 16, no. 3, pp. 497-510, June 2008]. These strategies typically rely on principles of "opportunistic overhearing" and judicious exclusive-ORing (XORing) of data packets to provide throughput gains in a network. The literature has provided mathematical analyses for this problem (see, e.g., "Network information flow," by Ahlswede et al., *IEEE Trans. Info. Theory*, vol. 46, no. 4, pp. 1204-1216, July 2000; "Insufficiency of Linear Coding in Network Information Flow," by Dougherty et al., *IEEE Trans. on Info. Theory*, vol. 51, no. 8, pp. 2745-2759, 2005), queue management optimization (see, e.g., "NCAPQ: Network Coding-Aware Priority Queueing for UDP Flows over COPE," by Seferoglu et al., *Int. Symp. on Network Coding (NetCod)*, pp. 1-8, July 2011; "Network Coding-Aware Queue Management for Unicast Flows over Coded Wireless Networks," by Seferoglu et al., *IEEE Int. Symp. on Network Coding*, pp. 1-6, June 2010), and alternative implementations (see, e.g., "MAC-Layer Proactive Mixing for Network Coding in Multi-Hop Wireless Networks," by Zhang et al., *Comput. Netw.*, vol. 54, no. 2, pp. 196-207, February 2010) that rest on the same principles. Throughput gains of up to 60% have been demonstrated with COPE-like coding techniques using commercial WiFi hardware, without changing the MAC structure, and implementing the coding on top of an existing routing scheme known as B.A.T.M.A.N. (see, e.g., "CATWOMAN: Implementation and Performance Evaluation of IEEE 802.11 based Multi-Hop Networks using Network Coding," by Hundeboll et al., *76th IEEE Veh. Tech. Conf (VTC)*, 2012), which is used to detect coding opportunities.

Intra-session coding strategies code packets of the same flow by intelligently combining packets received in individual routers of a network in a linear manner, and then transmitting these "coded packets" to the next-hops in the network. The source and intermediate nodes of the network use random linear network coding (RLNC) to create linear combinations of packets available in their buffers for each flow. The MORE protocol is a practical implementation of intra-session coding that provides a median throughput gain of 95% with respect to routing (see, e.g., "Trading Structure for Randomness in Wireless Opportunistic Routing," by Chachulski et al., 2007 Conference on Applications, Technologies, Architectures, and Protocols for Computer Communications (SIGCOMM '07), ACM, New York, N.Y., USA).

A protocol named CORE is described herein that provides a mixed network coding approach that allows sources and intermediate nodes in a network to generate RLNC packets for each flow, but also allows the network to identify regions where controlled inter-session coding can take place. Under the protocol, inter-session coding is restricted to the identified regions and the end receivers do not receive coded packets with contributions of other flows. Unlike COPE-based protocols, XORed packets at a relay in a CORE network are not discarded if overhearing is unsuccessful. XORing two packets (coded or not) is equivalent to creating a linear combination of the packets with coefficient 1 for each packet, irrespective of the extension field $GF(2^n)$ used. Therefore, the XOR of two coded packets can be used as an additional, richer coded packet that will be useful to recover future linear combinations of packets for a given flow. These advantages are brought forth by performing a more thorough partial decoding at the relays (i.e., not restricted to recovering XORed data). This decoding is possible due to the fact the relay does not combine the coding coefficients of RLNC packets from different flows, but instead it concatenates the coding coefficients. The CORE protocol is different from previous schemes in that: (i) it does not treat COPE and MORE as separate, coexisting coding protocols but instead uses them in a cooperative manner, (ii) it does not limit the analysis to a point to point connection, and (iii) the protocol is capable of optimizing energy performance by trading-off computation and transmission costs at intermediate nodes.

The CORE protocol was initially designed for use in wireless mesh and ad-hoc networks, but other applications also exist. CORE may use random linear network coding (RLNC) for unicast traffic sent over one or more routes. The routes may be generated beforehand using standard routing algorithms (e.g., B.A.T.M.A.N., etc.) and without coordination between the flows. CORE identifies regions in a network where two or more unicast flows intersect and where improvement is possible by performing inter-session coding (e.g., XORing RLNC packets from different flows). Potential coding regions may be identified for every instance where unicast flows intersect in the network (i.e., their paths cross and share an intermediate node). Coding regions can be recognized based on, for example, the knowledge of neighboring nodes and pre-specified patterns that make inter-session coding possible (see, e.g., FIG. 2). Typically, these coding regions will include a relay node and other nodes that are one hop from the relay node. However, more complex patterns can also be exploited. CORE relies on a local optimization at the coding regions that originate from the intersection of routes created for each unicast flow.

FIG. 1 is a network diagram illustrating an exemplary implementation of CORE in accordance with an embodiment. As shown, a wireless mesh network 10 may be supporting two unicast sessions 12, 14 (or flows) at a particular point in time, where each unicast session 12, 14 relies on multiple routes. For example, a first unicast session 12 between a source node 16 and a destination node 18 may use multiple routes (or paths) 20, 22 and a second unicast session 14 between a source node 24 and a destination node 26 may also use multiple other routes 28, 30. It should be appreciated that any number of routes per session may be used in other implementations. In the scenario of FIG. 1, four potential inter-session coding regions 32, 34, 36, 38 are identified where the flows: (i) share a common relay (e.g., relay node 40), and (ii) are arranged so that overhearing is possible between active nodes of different flows. For this example, each individual coding region 32, 34, 36, 38 corresponds to what will be referred to herein as an "X topology" (see FIG. 2). In the discussion that follows, principals of the CORE protocol will be described in the context of the X topology of FIG. 2. It should be appreciated, however, that other node configurations can also lead to coding opportunities and may also be considered by the protocol (e.g., the cross topology, the Alice and Bob topology, etc.). Although each unicast session 12, 14 shown in FIG. 1 includes multiple paths, it should be appreciated that sessions that utilize a single path may also be used in a CORE implementation.

The Alice and Bob topology, also known as the two-way relay topology, includes a relay node and two nodes (Alice and Bob) that are each one-hop away from the relay. In this topology, there are two flows going through the relay: one from Alice to Bob and another from Bob to Alice. The cross topology is comprised of a relay and four nodes (say, Alice, Bob, Cristina, and Dylan) that are one-hop away from the relay. There are four flows going through the relay: one from Alice to Bob, one from Bob to Alice, one from Cristina to Dylan, and one from Dylan to Cristina. Alice and Bob may or may not overhear Cristina and Dylan or vice-versa. Inter-session coding can be limited to just the pairs of flows (Alice to/from Bob and Cristina to/from Dylan) or be performed across all four flows. Both cases can gain from the use of CORE, but the second one can provide higher throughput gains in general and benefit more from CORE if there are overhearing capabilities.

If a single coding region is involved in the transmission of a session, this region should do everything possible to provide a resilient, loss-free link to higher layers. However, if multiple coding zones are available, computational effort and energy consumption can be traded off for spectral efficiency at each region. Due to space constraints, energy and throughput performance will be focused on in the present disclosure and a study of multi-region robustness and computational efforts will be left to future work.

As described above, CORE may use random linear network coding (RLNC) for unicast traffic sent over one or more routes in a network. RLNC generally involves generating linear combinations of data packets using randomly generated coefficients. For a particular flow, a generation size may be defined to specify the number of packets in the flow that will be used in each linear combination. The parameter $P_i^{(k)}$ may be defined as the $i^{th}$ data packet of flow k. The linear combinations of the flow may then be defined as:

$$C_i^{(k)} = \Sigma_{j=1}^{M_k} \alpha_{ij}^{(k)} P_j^{(k)}$$

where $C_i^{(k)}$ may be referred to as the $i^{th}$ "coded packet" or RLNC packet of flow k, $M_k$ is the generation size of flow k, and $\alpha_{ij}^{(k)}$ represent the randomly generated coefficients.

Some of the features of the CORE protocol will now be described. It should be appreciated that it is not necessary to implement all of described features of CORE together within a network to achieve enhanced performance within a network. That is, certain features can be implemented separately or in sub-groups while still achieving a certain level of performance enhancement. In CORE, each unicast session in a network may determine its ad-hoc route(s) independently of other active sessions. Classical routing techniques may be used to determine the routes. CORE may identify inter-session coding regions (e.g., coding regions 32, 34, 36, 38 in FIG. 2) in a distributed fashion, a process initiated by nodes (e.g., relays, etc.) that observe several intersecting sessions flowing in different directions. Inter-session coding regions will XOR packets of different flows within the region, but only forward RLNC packets of each flow to nodes not belonging to that specific coding region. One goal of CORE is to increase throughput in a network while maintaining the source and destination nodes of each flow agnostic to other flows in the network. CORE allows coded packets associated with a single flow to be combined both inside and outside the inter-session coding regions.

Figure 2:
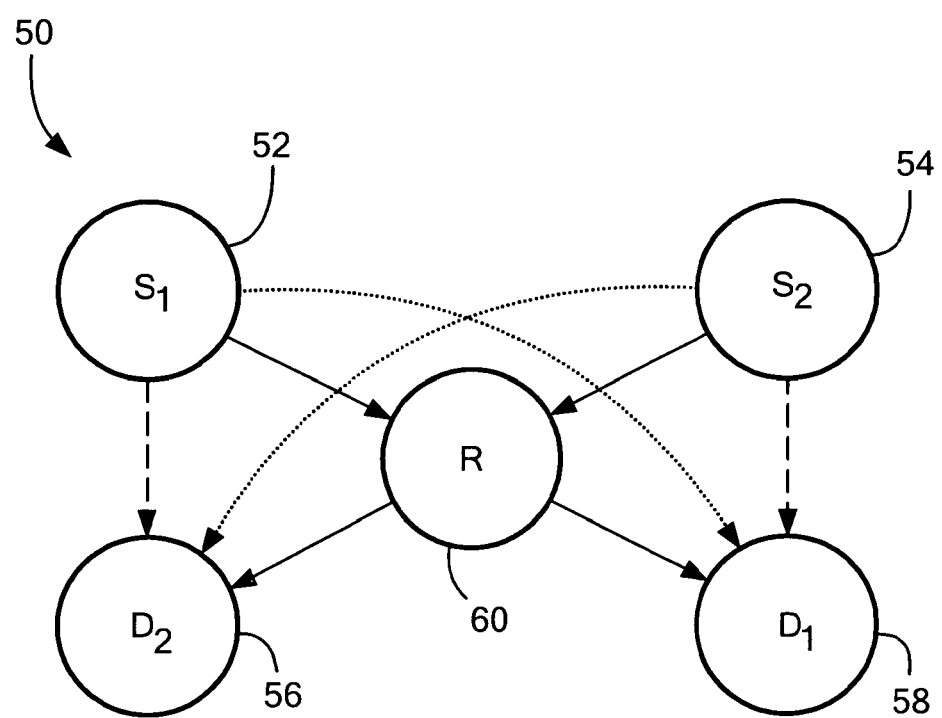
FIG. 2 is a diagram illustrating an X topology that may exist within an inter-session coding region of a wireless mesh network in accordance with an embodiment.

Referring now to FIG. 2, the X topology 50 involves five nodes associated with two different flows within a larger network. A first flow involves a first source node ($S_1$) 52 and a first destination node ($D_1$) 58 that communicate through a relay node (R) 60. A second flow involves a second source node ($S_2$) 54 and a second destination node ($D_2$) 56 that communicate through the same relay node (R) 60. Nodes in the X topology 50 may be able to overhear the packet transmissions of other nodes in the topology that are associated with different flows. Thus, the second destination node 56 may be able to overhear transmissions of first source node 52, and so on. As will be described in greater detail, these "overheard" transmissions may be stored for later use within a node in accordance with CORE.

Although the use of RLNC packets provides additional resiliency to packet losses across a network in general, it has been found that these RLNC packets can also be used to improve performance in the inter-session coding regions of a network. To be used in this manner, packet overhearing may also need to be relied upon within the inter-session coding regions. As is well known, packet overhearing operations are susceptible to losses. In accordance with the CORE protocol, the nodes are configured to not only overhear transmissions corresponding to other flows, but to also store the overheard transmissions locally. The stored transmissions may then be used to expedite the recovery process of each generation of packets.

Under CORE, the relay node 60 in a coding region XORs newly received RLNC packets of each corresponding flow. The resulting XORed packet is then forwarded to other nodes within the same coding region. However, no packet including content from multiple flows is transferred outside the coding region. To leverage the RLNC structure, the relay node 60 may: (i) XOR only the "data" within the RLNC packets, and (ii) keep the coding coefficients of each flow untouched. This feature distinguishes CORE from approaches that use RLNC and XOR coding in a manner where each coding type is agnostic to the other. If no new packets of one or more flows are available, in some implementations, the relay node 60 may generate a new RLNC packet for the flow by linearly combining packets in its queue corresponding to that flow (recoding on a per flow basis). The resulting packet may then be XORed with packets of the other flow(s) to generate a combined packet.

In some implementations, the relay node 60 within an inter-session coding region may be configured to send feedback to a transmitting node when it has received a sufficient number of linearly independent coded packets (or "degrees of freedom") to decode a particular generation (i.e., the relay has received enough coded packets to recover the original data for the generation). Although the relay 60 does not decode, signaling to the upstream node may allow the upstream node to cease transmissions for the present generation of packets and move on the next generation. Among other benefits, this technique can result in a significant power savings within the network.

Since CORE mixes RLNC packets of multiple flows within the coding regions, this seems to imply that some level of decoding must also be performed within these regions. That is, because packets transmitted out of the coding regions are associated with only a single flow, the coding region must include some mechanism to cancel the effect of one flow over the other within a combined packet. It can be shown that only a partial decoding, if any, is needed to recover linear combinations associated with a flow that had contributions from another flow. The CORE approach is opportunistic in the sense that: (i) it identifies regions that can benefit from inter-session coding, and (ii) it bolsters opportunistic listening due to the RLNC nature of coded packets at each flow. Item (i) above is in line with previous research using inter-session coding. Item (ii) relies on accumulating coded packets from the second flow, as well as XORed packets that have contributions from the two flows, in order to speed up the recovery of innovative random linear combinations (also known as degrees of freedom (dof)) for the first flow. Some examples will now be provided to illustrate some of the above-described features.

In a first example, the sequence of which is illustrated in Table 1 below, two flows intersect in an X topology as defined in FIG. 2. Each of the flows have a generation size of $M_1=M_2=3$ packets. As shown in Table 1, in the first two transmissions of the sequence, $D_1$ is unsuccessful in overhearing $S_2$. Therefore, $D_1$ only receives the XORed packets from relay 60. For a COPE-like system, these XORed packets are useless and are discarded (marked as X in Table 1). In CORE, on the other hand, the XORed packets coming from the relay node 60 constitute linear combinations that are stored for later use. These contributions correspond to the first two rows in FIG. 3a.

TABLE I

Sequence of Events in Example 1

| Loss in Link | Rx Packets CORE | dof flow 1/ total | Rx Packets COPE | Useful packets |
|---|---|---|---|---|
| ($S_2$, $D_1$) | $C_1^{(1)} + C_1^{(2)}$ | 0/1 | $P_1^{(1)} + P_1^{(2)}$ (x) | 0 |
| ($S_2$, $D_1$) | $C_2^{(1)} + C_2^{(2)}$ | 0/2 | $P_2^{(1)} + P_2^{(2)}$ (x) | 0 |
| ($S_2$, R) | $C_3^{(1)}; C_3^{(2)}$ | 1/4 | $P_3^{(1)}; P_3^{(2)}$ (✓) | 1 |
|  | $C_4^{(1)} + C_4^{(2)}$ | 3/6 | $P_4^{(1)} + P_4^{(2)}$ | 2 |
|  | $C_4^{(2)}$ |  | $P_4^{(2)}$ (✓) |  |

In the third transmission event, there is an unsuccessful transmission from $S_2$ to R, but a successful overhearing by $D_1$. In this case, $D_1$ receives a coded packet from flow 1 (i.e., $C_3^{(1)}$) as well as a coded packet from flow 2 (i.e., $C_3^{(2)}$). For a COPE-like system, this would result in a successful packet reception at $D_1$ (marked as ✓ in Table 1). For CORE, this provides not only a dof for flow 1, but also an additional dof corresponding to flow 2 that could be used to recover other dofs locked in XORed packets.

The last event in Table 1 represents a case of successful reception and successful overhearing. COPE recovers an additional packet for flow 1. CORE can free two additional dofs at this point. This is clear when inspecting the matrix of FIG. 3a, which shows the linear combinations received until this last transmission event. For a large enough field size, the matrix is invertible with high probability allowing us to recover all dofs of flow 1 and allowing $D_1$ to forward coded packets to other nodes in the network. After the four transmission events of Table 1, each of which requires several packet transmissions in the coding region, a COPE-like approach produces only two useful packets while CORE provides $D_1$ with three dofs.

It should be understood that a node recovering one or more dofs of a flow can immediately use the dofs to generate new RLNC packets. Thus, the CORE protocol does not delay the transmission of coded packets. On the contrary, it reduces the delay with respect to COPE-like approaches by allowing nodes to unlock additional dofs contained in XORed packets.

Using CORE, full decoding of the received coded packets is both expensive and unnecessary. In fact, only partial decoding is needed to recover all 3 dofs necessary for flow 1. FIG. 3b demonstrates this by reordering the rows in the matrix and performing partial decoding starting on coded packets of flow 2. The process can stop after three rows as there is no need to decode packets of flow 1, just to eliminate the contribution of flow 2. There is also no need to decode packets of flow 2 at $D_1$. Thus, the number of operations can be quite limited. Additionally, $D_1$ may decide to postpone the partial decoding process waiting for an additional coded packet from the relay, thus providing a clear trade-off between complexity and delay.

A second example of the potential benefits of CORE is illustrated in Table 2 below. Observe that a first transmission event constitutes a successful transmission on all links, leading to a packet recovery in COPE and the immediate recovery of a dof for flow 1 in CORE. However, CORE will also store $C_1^{(2)}$ for later use. The next three transmission events correspond to an unsuccessful overhearing and two missed XORed transmissions from the relay, respectively. Clearly, a COPE-like system will have no benefit from these events. However, CORE will be able to recover an additional dof after these first 4 events. Finally, at the last transmission event, overhearing fails at $D_1$. In a COPE-like system, this results in a lost transmission for $D_1$, while with CORE this XORed packet will provide an additional dof. This example shows a case in which COPE will provide only 1 useful packet while CORE provides 3 dof.

TABLE II

Sequence of Events in Example 2

| Loss in Link | Rx Packets CORE | dof flow 1/ total | Rx Packets COPE | Useful packets |
|---|---|---|---|---|
| | $C_1^{(1)} + C_1^{(2)}$ $C_1^{(2)}$ | 1/2 | $P_1^{(1)} + P_1^{(2)}$ $P_1^{(2)}$ (✓) | 1 |
| $(S_2, D_1)$ | $C_2^{(1)} + C_2^{(2)}$ | 1/3 | $P_2^{(1)} + P_2^{(2)}$ (x) | 1 |
| $(R, D_1)$ | $C_3^{(2)}$ | 1/4 | $P_3^{(2)}$ (x) | 1 |
| $(R, D_1)$ | $C_4^{(2)}$ | 2/5 | $P_4^{(2)}$ (x) | 1 |
| $(S_2, D_1)$ | $C_5^{(1)} + C_5^{(2)}$ | 3/6 | $P_5^{(1)} + P_5^{(2)}$ (x) | 1 |

In some implementations, as described above, unicast sessions that include multiple different paths between a source and a destination (see, e.g., FIG. 1) may be used. In some multi-path implementations, some coordination between coding regions may be used to effectively manage resources. For example, coordination may be used to determine a level of effort that will be used in a particular coding region based on, for example, activities occurring in other coding regions where two specific flows intersect. In some embodiments, such coordination may be implemented in a distributed manner in a network using communication between nodes in different coding regions to determine which coding activities will take place in the different regions.

A comparison will now be made between COPE and CORE. For the comparison, an X topology will be assumed for the coding region, as shown in FIG. 2. For the analysis, it will be assumed that the relay node 60 only XORs packets from the two flows. An independent loss probability will also be assumed for each link as $e_{i,j}$, where $i,j \in \{R, S_1, S_2, D_1, D_2\}$. Two forwarding schemes are presented that capture the performance of the system in low and high load settings, respectively, and a COPE-like scheme is presented in order to understand the challenges of previous state-of-the-art. Three versions of CORE are provided, each of which incorporates progressively higher capabilities. The proposed scheme is labeled CORE, while the simpler versions are identified by the feature they are missing (namely, recoding at the relay and/or feedback from relay). Since approaches that combine inter- and intra-flow separately (see, e.g., "I2NC: Intra- and Inter-session Network Coding for Unicast Flows in Wireless Networks," by Seferoglu et al., IEEE INFOCOM, pp. 1035-1043, April 2011) inherently provide a rateless flow and because in the present setting it is assumed that a delay-free ARQ mechanism is in place for the COPE-like approach, the performance of the former is the same to that of the COPE-like scheme in the present setting.

Comparison Schemes

1. Forwarding

Node $S_i$ sends packets to $D_i$ via the relay. This forwarding scheme relies on MAC layer retransmissions to deliver data packets. The maximum number of retransmissions is set to a value $r_{max}$. If an end-to-end loss of a packet occurs, it is assumed that the application layer at the source will reinsert the packet in its queue for reattempting its delivery. The relay only transmits if it has received new packets. If it is assumed that an IEEE 802.11 MAC layer is being used that gives every node a fair share of the channel's resources, this case will correspond to transmissions well below the channel's maximal rate.

2. Forwarding with Resource Constraints

If it is assumed that an IEEE 802.11 MAC layer is being used that gives every node a fair share of the channel's resources, the relay node 60 becomes a bottleneck for the network, as shown in "Network Information Flow," by Ahlswede et al and, "Trading structure for randomness in wireless opportunistic routing," by Chachulski et al. Thus, the relay node 60 cannot forward both packets sent by each source 52, 54. In a high load scenario, the relay will only be able to access the channel once for every two received packets. This effect may be modeled by considering that one of the two packets, chosen uniformly at random, is dropped at the relay. If only one packet is received successfully at the relay, no packet is dropped.

3. Cope-Like

It may be assumed that the MAC protocol will retransmit data packets up to a maximum of $r_{max}$ in the links from $S_i$ to R and will retransmit XORed packets from R until receiver $D_i$ acknowledges reception. $D_j$, $j \neq i$ must overhear the transmissions from R in order to capture an XORed packet as described in "CATWOMAN: Implementation and Performance Evaluation of IEEE 802.11 based Multi-Hop Networks using Network Coding," by Hundeboll et al., 76th IEEE Veh. Tech. Conf. (VTC), 2012. This assumption is made to maintain compatibility with commercial systems because MAC layers in wireless networks (e.g., WiFi, etc.) provide Automatic Repeat reQuest (ARQ) mechanisms for unicast but not for broadcast transmissions. Incoming packets at the relay node are stored in a queue corresponding to the corresponding flow. The relay waits for each source to transmit a packet with up to $r_{max}$ attempts. Then, the relay is given time to transmit. The relay XORs a packet from each flow if both queues are non-empty. If one queue is empty, a packet from the other queue will be forwarded. In the case where both queues are empty, no transmission will take place. A queue for a flow is empty if the corresponding source was unsuccessful after $r_{max}$ attempts.

As shown in Lemma 1 below, the $D_i$'s have a non-zero probability of not recovering the XORed data packet. The reason is that a COPE-like approach in the X topology requires overhearing for data recovery. If a packet is lost end-to-end to $D_i$, $S_i$ will reinsert the packet in its outgoing queue and attempt a retransmission of that packet. The transmission stops when the $D_i$'s receive all packets.

Lemma 1.

In a X topology implementing a COPE-like scenario, the probability of a destination $D_i$ to recover a packet of its intended flow i is upperbounded by $$\frac{1 - e_{S_j, D_i}}{1 - e_{S_j, D_i} e_{S_j, R}}, i \neq j,$$

if $D_i$ is guaranteed delivery by R. If $D_i$ overhears transmissions from R to receive an XORed packet, then the probability of correct recovery is upperbounded by $$\frac{1 - e_{S_j, D_i}}{1 - e_{S_j, D_i} e_{S_j, R}} \frac{1 - e_{R, D_i}}{1 - e_{R, D_j} e_{R, D_i}}, i \neq j.$$

The bounds are tight if $r_{max} \rightarrow \infty$.

Assuming symmetric link losses (i.e., $e_{i,j} = e$, $\forall i, j$, $i \neq j$, with $e=0.1$), the probability of recovering a packet for each node is at most 0.91 for $D_i$ that overhears transmissions from only $S_j$, $j \neq i$ and at most 0.826 for $D_j$ that overhears transmissions from both $S_i$ and R. Clearly the gain from reducing the number of transmissions by XORing packets at the relay may be negated even by moderate overhearing losses because these can translate in retransmissions at higher layers. The $D_i$'s experience asymmetric losses when one of them is chosen to become the unicast destination. To avoid this asymmetry, the choice for each new XOR packet may be altered. Furthermore, the COPE-like approach disregards some of COPE's features (e.g., fall back to forwarding in high-error scenarios).

4. Core with No Recoding, No Feedback

In the simplest CORE scheme, the relay performs inter-session coding every time a coding opportunity is detected (e.g., each time a new RLNC packets is received from each source). In the absence of coding opportunities, the relay falls back to forwarding received RLNC packets. The source nodes ($S_i$) send RLNC packets to the destination nodes ($D_i$) with no recoding at the relay node. Packets are transmitted using unicast sessions, as in the COPE-like approach, allowing up to $r_{max}$ retransmissions. When transmitting from the relay, the destination with the highest loss probability is chosen as receiver, and the other destination is forced to overhear. If link quality is the same, $D_i$ is chosen uniformly at random.

5. Core without Feedback

In this approach, the relay still performs inter-session coding. However, in the absence of new coding opportunities (i.e., new RLNC packets received from each source), the relay generates an RLNC packet for each flow from previously received packets of the corresponding flow (recoding), thus providing a new inter-session coding opportunity. Recoding requires the relay to store each received packet of the generation and to be able to handle RLNC, thus requiring additional computational power. Transmission between nodes is again unicast but with no retransmissions. This ensures that each packet from the sources is unique and therefore attractive for overhearing. No transmissions are then wasted on repeating the same packet several times, which is of no value to the overhearing receiver if it has already received the transmission.

Core

CORE constitutes the full version of the proposed protocol. The relay provides RLNC recoding, as in CORE without feedback, and when the relay has accumulated enough dofs to recover the generation, it uses feedback to signal the corresponding source to stop sending additional packets, effectively reducing the required amount of transmissions. This disables potential overhearing between a source $S_i$ and its overhearing destination $D_j$, $j \neq i$. However, results show that the benefits of a reduced number of transmissions from the source surpasses the benefits of overhearing.

To investigate the gains of CORE, a preliminary simulation setup was developed. The simulation setup focuses on the simplified X topology of FIG. 2 and serves the purpose of investigating the efficiency for various transmission strategies. The main performance metric of the simulation is the number of transmissions per successfully received packet. The simulation assumes a given number of packets per source and stops when both destinations have received their respective source packets. This implies that the simulation setup does not incorporate a MAC-layer. Packet losses are assumed to be i.i.d. RLNC is performed using the Kodo C++ library.

In the simulated setup, all of the comparison schemes are investigated. The forwarding scheme with resource constraints is incorporated to capture the performance of a MAC layer (e.g., CSMA/CA in WiFi, etc.) that provides fair access to all users and will thus prevent access to the channels for the relay twice as often as the other nodes when the system is in high load. When appropriate, the maximal number of retransmissions used in the simulations is $r_{max}=100$. To reduce the number of variables in the simulation, the packet loss probabilities from and to the relay are made equal $e_{S_1,R} = e_{S_2,R} = e_{R,D_1} = e_{R,D_2} = e_X$ while the overhearing probabilities between sources and destinations, namely $e_{S_1,D_2} = e_{S_2,D_1} = e_{OH}$, are different from $e_X$.

Figure 4:
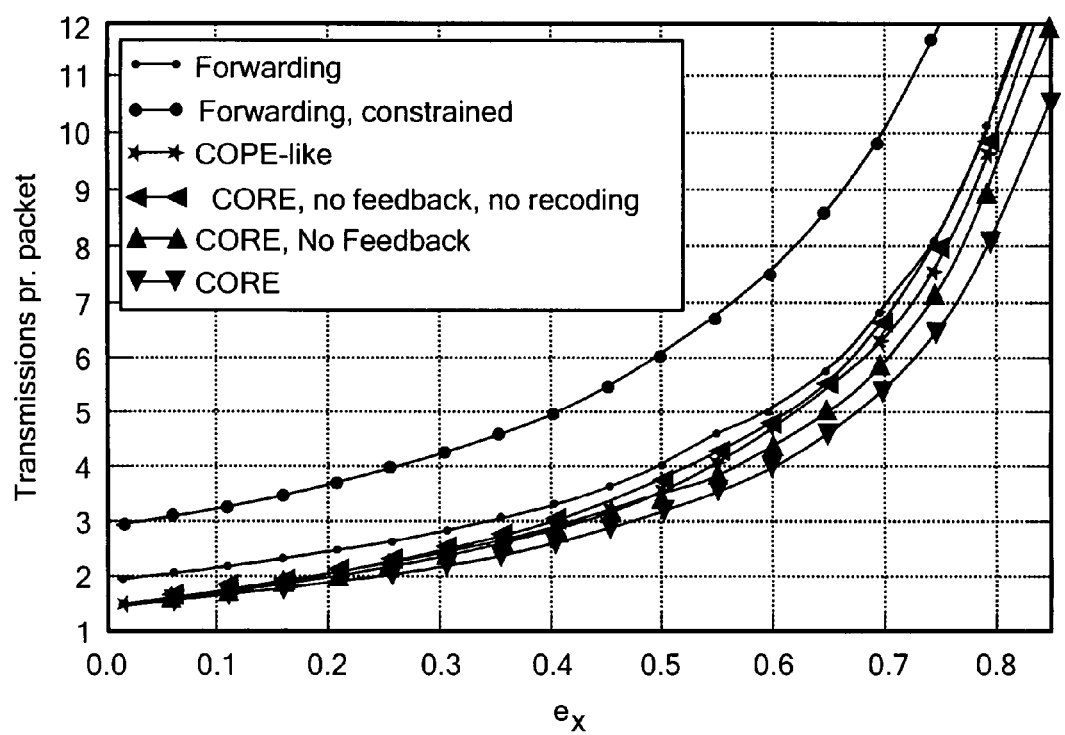
FIG. 4 is a graph illustrating an average number of transmissions for each source packet with $e_{OH}=0$ for each of a number of different comparison schemes.

FIG. 4 is a graph illustrating the average number of transmissions for each source packet with $e_{OH}=0$ for each of the different comparison schemes. The CORE schemes are simulated with $GF(2^8)$ and a generation size of 64. FIG. 4 shows that with perfect overhearing ($e_{OH}=0$) the efficiency of the COPE-like transmission scheme is on par with the CORE schemes, especially in scenarios with small loss probability on the wireless channel. Unconstrained conventional forwarding requires 33.33% more transmissions per packet compared to the coding schemes. For large values of $e_X$ and perfect overhearing, CORE outperforms the COPE-like scheme by up to 1.5 transmissions per packet. This means that the COPE-like scheme will require up to 20% more transmissions even with perfect overhearing. In FIG. 4, the significance of opportunistic coding is clear when comparing the COPE-like and all CORE schemes to the case of forwarding with a throughput-constrained relay. Here, the forwarding scheme requires up to twice as many transmissions per packet.

Figure 5:
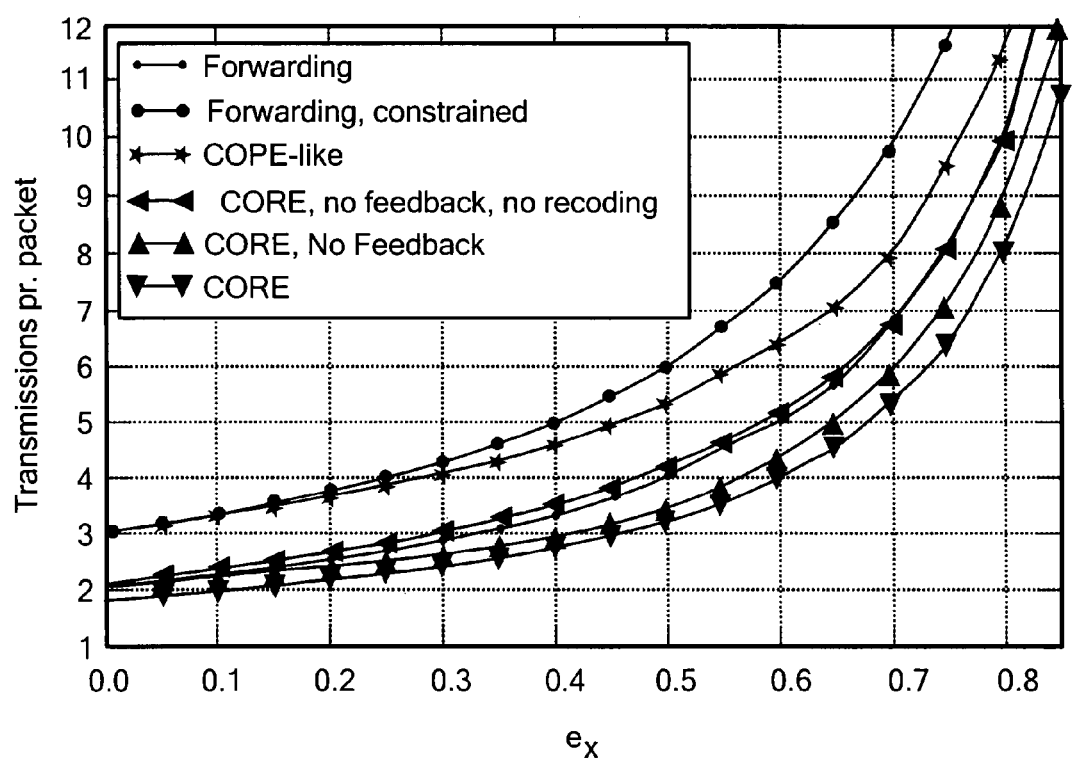
FIG. 5 is a graph illustrating an average number of transmissions for each source packet with $e_{OH}=0.5$ for each of the comparison schemes.

FIG. 5 is a graph illustrating the average number of transmissions for each source packet with $e_{OH}=0.5$ for each of the comparison schemes. Again, the CORE schemes are simulated with $GF(2^8)$ and a generation size of 64. FIG. 5 shows that the advantages of CORE over the COPE-like scheme are clear when overhearing errors are introduced. The COPE-like scheme relies on good quality overhearing to recover data packets, because XORed packets are useless at the destination nodes if no overhearing of the other flows packet takes place. On the other hand, in all CORE schemes the coded packets are stored because they have the potential of being useful at a later stage. This difference results in an improvement of up to 50% for an $e_{OH}$ of 0.5 (i.e., the COPE-like scheme needs to send 50% more packets than the best CORE scheme).

FIGS. 4 and 5 show that simpler versions of CORE that forego recoding at the relay and/or feedback from the relay provide improvements over forwarding, although not as significant as the full mechanism. FIG. 5 shows that having no feedback from the relay results in a performance loss of 0.3 dB (0.45 dB) for $e_X=0.5$ ($e_X=0.7$). In addition, giving up the ability to recode results in an additional reduction of 0.84 dB (0.57 dB) for $e_X=0.5$ ($e_X=0.7$).

Figure 6:
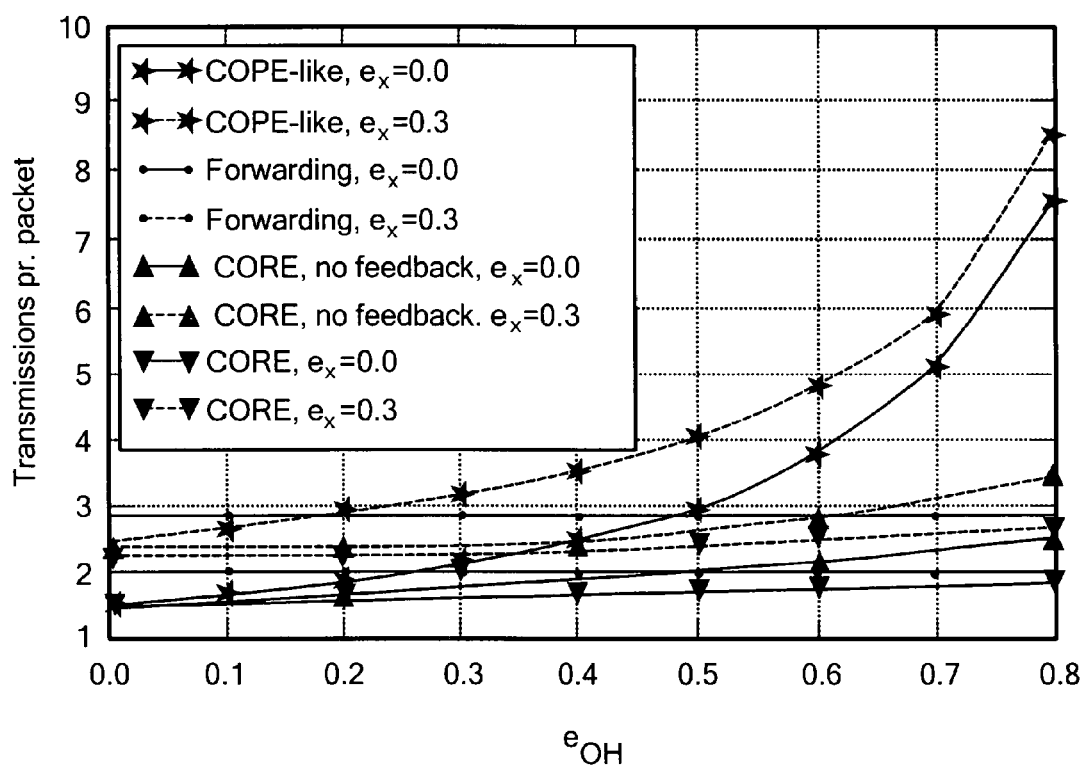
FIG. 6 is a graph illustrating the effect of increasing $e_{OH}$ for $e_X=0.0$ and $e_X=0.3$ for various comparison schemes.

FIG. 6 is a graph illustrating the effect of increasing $e_{OH}$ for $e_X=0.0$ and $e_X=0.3$ for various comparison schemes. As above, the CORE schemes are simulated with $GF(2^8)$ and a generation size of 64. FIG. 6 shows that the gains of the COPE-like scheme compared to forwarding decrease for both increasing $e_X$ and $e_{OH}$. In fact, there is a breaking point for which the COPE-like scheme has worse performance than the forwarding scheme. In FIG. 6, this happens for $e_{OH}=0.25$ and $e_{OH}=0.2$ for the cases of $e_X=0$ and $e_X=0.3$, respectively. In contrast, FIG. 6 shows that CORE's performance is always superior to that of unconstrained forwarding and to COPE-like schemes. In fact, CORE shows around 4 fold improvement over the COPE-like scheme when the overhearing channels have poor quality, which is not unusual in wireless meshed networks. Finally, FIG. 6 shows that CORE without feedback provides an improvement over unconstrained forwarding for moderate $e_{OH}$, although it is inherently more energy expensive for $e_{OH}>0.4$.

The efficiency gained with CORE can help improve throughput by reducing the amount of traffic in the network. It should be noted that the improved efficiency of CORE is expected to improve throughput when applied to a wireless network due to MAC-layer behavior. A simple comparison point used in the analysis is the comparison of CORE to the constrained forwarding scheme. The improvement in efficiency is rooted in a trade-off in increased processing power, due to the use of RLNC operations. CORE with no feedback and no recoding may be of interest in deployments with nodes with limited processing power, although with a reduction in overall efficiency.

Figure 7:
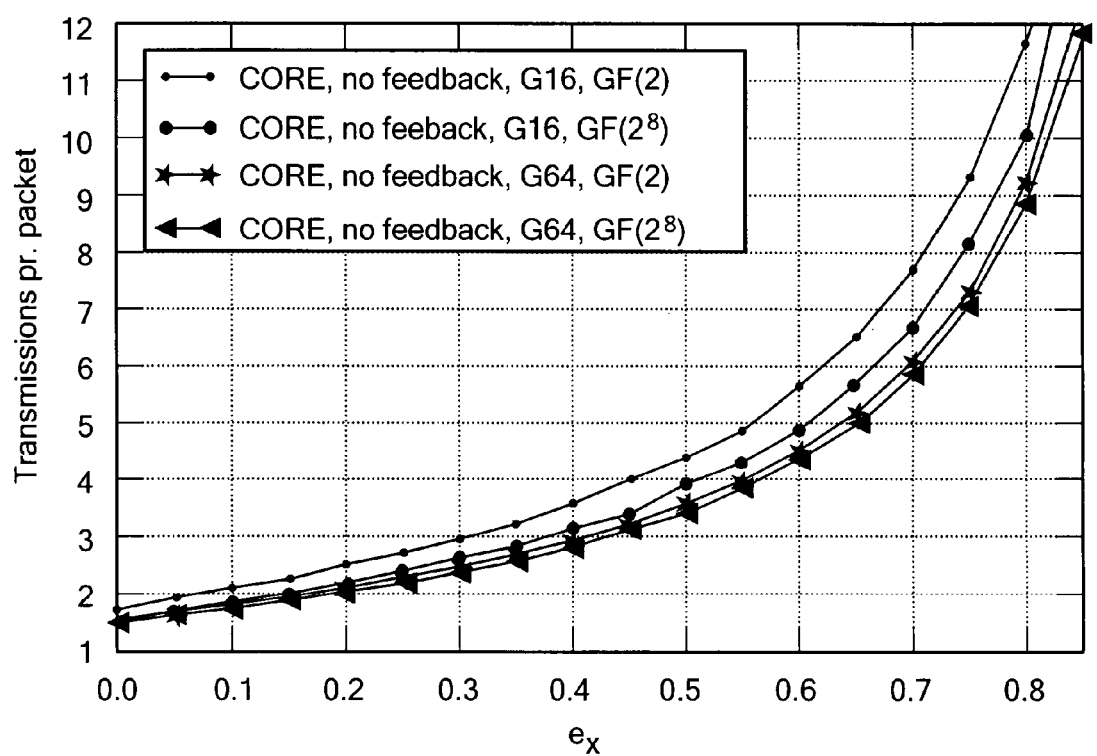
FIG. 7 is a graph illustrating the effect on efficiency caused by changes in both field size and generation size for various comparison schemes.

Although $GF(2^8)$ was used in the simulations, smaller field sizes (e.g., GF(2), etc.) may be used to trade-off the computational requirements of RLNC for a slight reduction in efficiency. A decrease in generation size may be needed to reduce the coding/recoding/partial decoding complexity at the relays, but also to comply with delay-sensitive traffic. Furthermore, decreasing the generation size increases the coding throughput, along with decreasing the delay caused by RLNC block decoding, but it increases the coding overhead due to linear dependency, especially for GF(2) implementations. The impact in efficiency for changes in both field size and generation size is illustrated in FIG. 7.

The present disclosure describes a protocol for use in wireless mesh networks and other networks that brings together (i) intra-session network coding using RLNC in each individual flow, and (ii) inter-session coding, by appropriately XORing RLNC packets of different flows at intermediate nodes in topologies similar to those exploited by COPE-like schemes. CORE can enhance the reliability of individual sessions by the use of RLNC, while exploiting the broadcast nature of wireless channels using overhearing and opportunistic coding. Further more, CORE provides a solution to a long-standing issue of COPE-like schemes: the ability to cope with unreliable overhearing, which has the potential to curb or negate the benefits of COPE-like schemes. Numerical results show that CORE provides gains of up to four fold over COPE-like schemes in an X topology. It has also been shown that COPE-like schemes may become counter-productive with respect to pure forwarding if the loss rate for overhearing is higher than 0.25 for low load scenarios. CORE outperformed all other considered schemes for a wide range of conditions. Simulations have also shown that improvements may be achieved even if less than the full CORE protocol is implemented. That is, the more functionality and effort a system is ready to incorporate, the better performance will be achieved. However, even CORE strategies with limited functionality will provide gains with respect to COPE-like and pure forwarding schemes.

Figure 8:
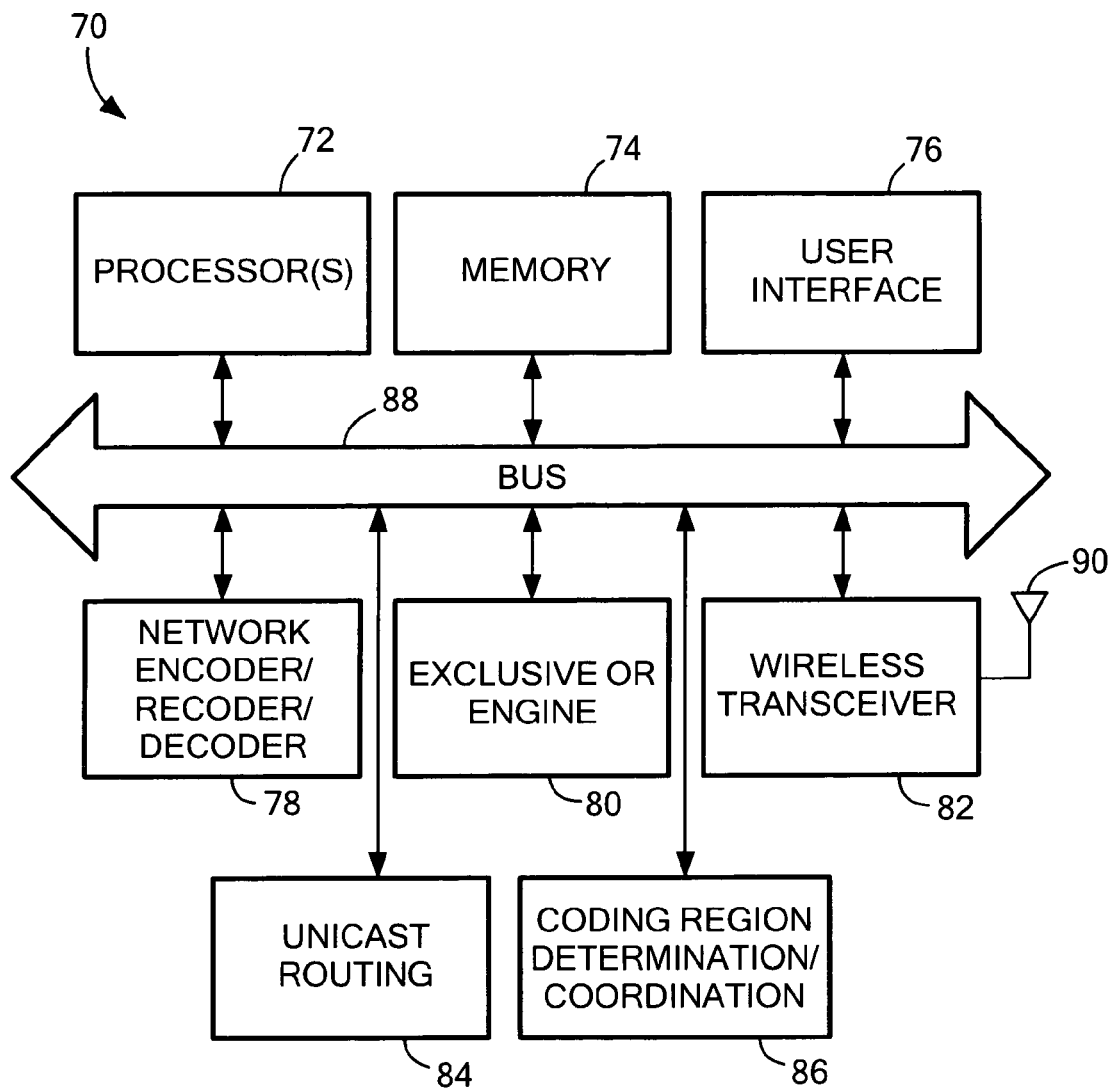
FIG. 8 is a block diagram illustrating an example node architecture that may be used in a node of a network that incorporates features of the present disclosure.

FIG. 8 is a block diagram illustrating an example node architecture 70 that may be used in a node of a network that incorporates features of the present disclosure. As illustrated, the node architecture 70 may include: one or more digital processors 72, a memory 74, a user interface 76, a network encoder/recoder/decoder 78, an exclusive OR engine 80, a wireless transceiver 82, a unicast routing unit 84, and a coding region determination unit 86. A bus 88 and/or other structure(s) may be provided for establishing interconnections between various components of device architecture 70. Digital processor(s) 72 may include one or more digital processing devices that are capable of executing programs or procedures to provide functions and/or services for the corresponding node or user. Memory 74 may include one or more digital data storage systems, devices, and/or components that may be used to store data and/or programs for other elements of node device architecture 70. User interface 76 may include any type of device, component, or subsystem for providing an interface between a user and a corresponding node device. Wireless transceiver 82 may include any type of transceiver that is capable of supporting wireless communication with one or more remote wireless entities.

Unicast routing unit 84 is operative for determining one or more unicast routes through a wireless mesh network for a corresponding unicast session. The unicast routing unit 84 may use any of a number of different routing algorithms or strategies to determine routes. The unicast routing unit 84 may be capable of defining a single path or multiple paths through a network for a unicast session. Coding region determination unit 86 is operative for identifying inter-session coding regions within a wireless mesh network within which localized combining of coded RLNC packets associated with different sessions can be performed. In some embodiments, coding region determination unit 86 may also be configured to perform or support a coordination function between inter-session coding regions of a network. For example, the coding region determination unit 86 may be configured to interact with a similar unit in a node of another inter-session coding region associated with the same unicast sessions to more effectively manage resources.

Exclusive OR engine 80 is operative for combining coded packets associated with multiple different flows in a network within a coding region when a corresponding node is being used as a relay node. As described previously, packets that include contributions from multiple different flows will not be allowed to flow outside of an inter-session coding region in the network. Although illustrated as separate units, it should be appreciated that any one or more of the network encoder/recoder/decoder 78, the exclusive OR engine 80, the unicast routing unit 84, and the coding region determination unit 86 may be implemented, either partially or fully, within another component or device of a corresponding node in some implementations (e.g., within processor(s) 72 of FIG. 8, etc.).

Digital processor(s) 72 may include, for example, one or more general purpose microprocessors, digital signals processors (DSPs), controllers, microcontrollers, application specific integrated circuits (ASICs), field programmable gate arrays (FPGAs), programmable logic arrays (PLAs), programmable logic devices (PLDs), reduced instruction set computers (RISCs), multi-core processors, processor complexes, and/or other processing devices or systems, including combinations of the above. Digital processor(s) 72 may be used to, for example, execute an operating system for a corresponding node device. Digital processor(s) 72 may also be used to, for example, execute one or more application programs for a node device. In addition, digital processor(s) 72 may be configured to implement, either partially or fully, one or more of the communications related processes or techniques described herein in some implementations.

As described above, wireless transceiver 82 may include any type of transceiver that is capable of supporting wireless communication with one or more remote wireless entities. In various implementations, the wireless transceiver 82 may be configured in accordance with one or more wireless networking standards and/or wireless cellular standards. In some implementations, multiple wireless transceivers may be provided to support operation in different networks or systems in a surrounding environment or with different wireless networking and/or cellular standards. Wireless transceiver 82 may, in some implementations, be capable of communicating with peer devices in a peer-to-peer, ad-hoc, or wireless mesh network arrangement. In addition, in some implementations, wireless transceiver 82 may be capable of communicating with a base station or access point of an infrastructure-type wireless communication system or network. As illustrated in FIG. 8, wireless transceiver 82 may be coupled to one or more antennas 90 and/or other transducers, to facilitate the transmission and/or reception of communication signals. In some implementations, wireless transceiver 82 may be used to implement, either partially or fully, one or more of the communications related processes or techniques described herein. It should be appreciated that the techniques described in the present disclosure may, in some implementations, be implemented in wired communications networks or other networks or systems that do not use wireless communication. In some of these implementations, wireless transceiver 82 may be replaced with or supplemented by, for example, a wired communication device, component, card, or other structure.

Memory 74 may include any type of system, device, or component, or combination thereof, that is capable of storing digital information (e.g., digital data, computer executable instructions and/or programs, etc.) for access by a processing device and/or other component. This may include, for example, semiconductor memories, magnetic data storage devices, disc based storage devices, optical storage devices, read only memories (ROMs), random access memories (RAMS), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

Network encoder/recoder/decoder 78 may include a device, system, or circuit for performing network encoding, recoding, and/or decoding for a node device. In a source node device that will generate and transmit network coded packets, network encoder/recoder/decoder 48 may include network encoding functionality (e.g., software, firmware, or circuitry for implementing random linear network coding). Likewise, in a receiving device that will receive and decode network coded packets, network encoder/recoder/decoder 78 may include decoding functionality. In a node that may serve as both a source node and a destination node, both network encoding and decoding functionality may be provided. In an intermediate node, including but not limited to the relays in the coding regions, that will receive, store, recode within the same flow (intra-session), code across sessions (inter-flow), and transmit network coded packets, the network encoder/recoder/decoder 48 may include network encoding, network decoding, and/or network recoding functionalities.

It should be appreciated that the node architecture 70 of FIG. 8 represents one possible example of a node architecture that may be used in an implementation. Other architectures may alternatively be used. As used herein, the term "node device" or "node" is used to describe any type of digital electronic device, system, or structure that includes some form of communication capability (wireless and/or wired) and may become part of a network. This may include, for example, a laptop, desktop, notebook, or tablet computer; a personal digital assistant (PDA); a personal communication service (PCS) device; a personal navigation assistant (PNA); a cellular telephone, smart phone, or other wireless communication device; a pager; a wireless sensor device; a satellite communication device; a media player having communication capability; a digital storage device with communication capability, a wireless base station, a wireless access point, a subscriber station, a wireless transceiver device, an integrated circuit, a network server, and/or other devices and systems. It should be appreciated that all or part of the various devices, processes, or methods described herein may be implemented using any combination of hardware, firmware, and/or software. In some embodiments, a wireless communication device may be provided that is capable of operation as either a source node, a relay node, or a destination node within an inter-session coding region. The functions performed by the communication device will thus depend upon its status in the underlying network at a particular point in time.

Figure 9:
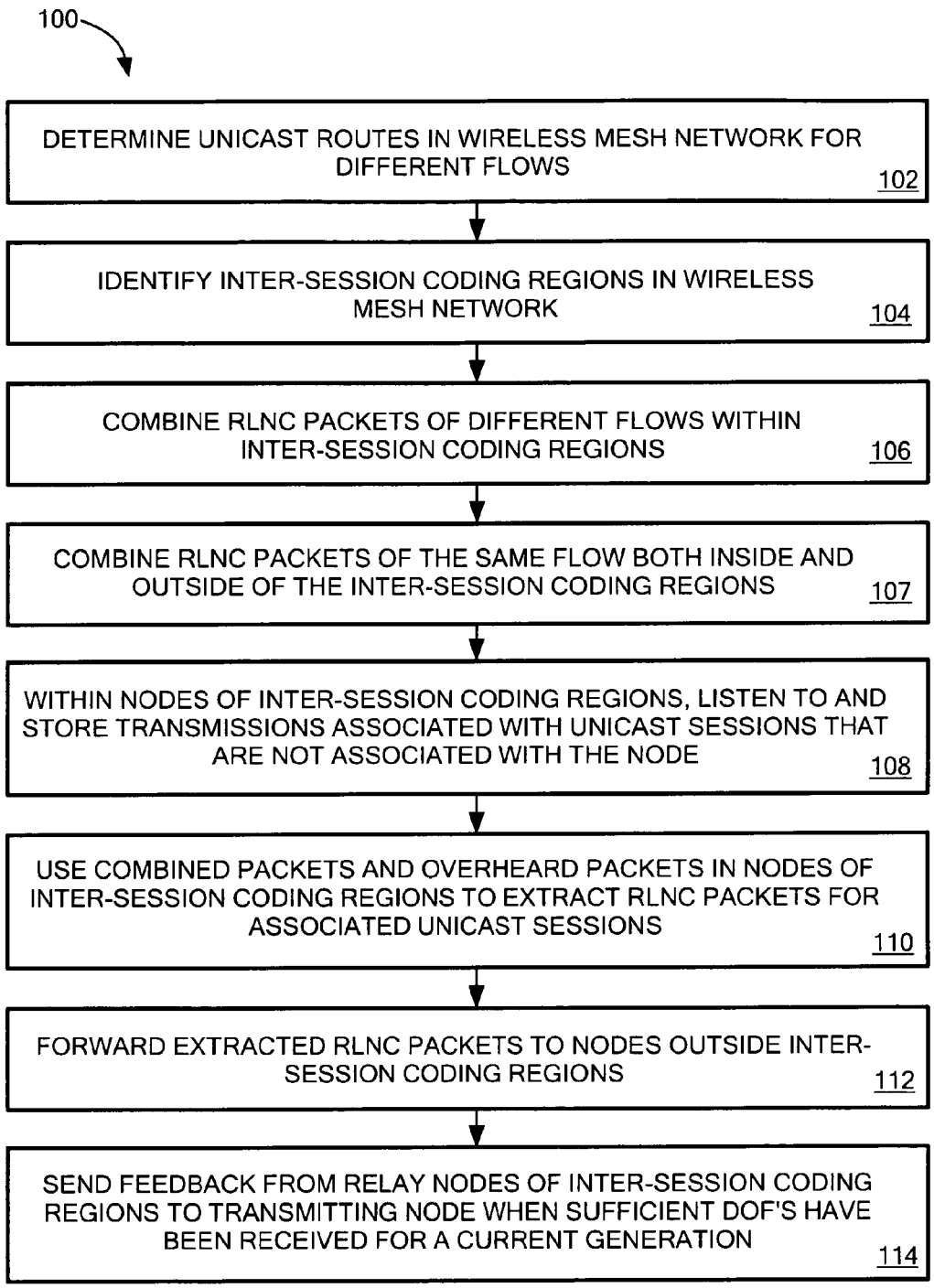
FIG. 9 is a flow diagram illustrating a process for implementing CORE within a wireless mesh network in accordance with an embodiment.

FIG. 9 is a flow diagram illustrating a process 100 for implementing CORE within a wireless mesh network in accordance with an embodiment.

The rectangular elements (typified by element 102 in FIG. 9) are herein denoted "processing blocks" and may represent computer software instructions or groups of instructions. It should be noted that the flow diagram of FIG. 9 represents one exemplary embodiment of a design provided herein and variations in such a diagram, which generally follow the process outlined, are considered to be within the scope of the concepts, systems, techniques, circuits, and protocols described and claimed herein.

Alternatively, the processing blocks may represent operations performed by functionally equivalent circuits such as a digital signal processor circuit, an application specific integrated circuit (ASIC), or a field programmable gate array (FPGA). The flow diagram does not depict the syntax of any particular programming language. Rather, the flow diagram illustrates the functional information one of ordinary skill in the art requires to fabricate circuits and/or to generate computer software to perform the processing required of a particular apparatus or method. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the actions shown in FIG. 9 can be performed in any convenient or desirable order.

Referring now to FIG. 9, unicast routes through a wireless mesh network are determined for different flows in the network (block 102). Each unicast session may determine its own route(s) independently of other active sessions. In addition, each unicast session may rely on multiple routes through the network. Well known routing techniques may be used to determine the routes (e.g., B.A.T.M.A.N., etc.) for the unicast sessions. Inter-session coding regions may then be identified within the network (block 104). In some implementations, inter-session coding regions will only be identified that are capable of benefitting from inter-session coding. In some implementations, the inter-session coding regions are identified in a distributed manner (e.g., by relay nodes in the network, etc.). For example, relay nodes within the network may be configured to observe several intersecting unicast sessions flowing in different directions and determine regions where overhearing and RLNC packet combination may be used in a manner that improves overall efficiency in packet delivery. Each of the inter-session coding regions may include a relay node that is associated with more than one unicast session (e.g., node 40 in FIG. 1). In addition, each inter-session coding region may have one of a number of different topologies (e.g., the X topology, the cross topology, the Alice and Bob topology, etc.).

When inter-session coding regions have been identified, relay nodes within the regions may be used to combine RLNC packets of different flows (block 106). In at least one embodiment, the RLNC packets are combined in the relay nodes by XORing the coded data, but concatenating the coding coefficients of each RLNC flow. The combined packets are then forwarded to other nodes within the same inter-session coding region. However, as described previously, combined packets that include RLNC packets from multiple sessions will not be forwarded to nodes outside the inter-session coding region (i.e., only RLNC packets associated with a single session will be forwarded outside each region). In one approach, the relay nodes will only XOR the "data" within the RLNC packets of different flows. That is, the relays will not change the coding coefficients of the packets. In some implementations, if one or more flows do not have a new RLNC packet to be XORed, a relay node may generate a new RLNC packet for the flow by linearly combining RLNC packets associated with the flow that are stored within the queue of the relay node. The generated new packet may then be XORed with RLNC packets of one or more other flows.

As described above, RLNC packets associated with different flows may be combined within the inter-session coding regions, but not outside these regions. Combinations of RLNC packets associated with the same flow may also be made within the wireless mesh network (block 107). However, unlike the combination of packets of different flows, the combinations of packets of the same flow are not limited to the inter-session coding regions. That is, these combinations can occur both inside and outside of the coding regions. The combinations may be performed using, for example, an exclusive-OR operation, but more generally using finite field arithmetic for higher field sizes.

The nodes of each inter-session coding region will listen to (i.e., overhear) transmissions associated with other flows and store these signals for later use (block 108). These stored overheard packets may later be used to decode combined packets within the nodes of the inter-session coding region to extract RLNC packets associated with a corresponding unicast session (i.e., a unicast session associated with the node performing the decoding). The RLNC packets associated with the corresponding unicast session may then be forwarded outside the inter-session coding region (block 112).

In some implementations, the relay nodes within the inter-session coding regions of the network may deliver feedback to the nodes transmitting RLNC packets to the relay when the relay node has received sufficient coded packets to enable decoding of original packets for a present generation (i.e., when a sufficient number of DOFs have been received) (block 114). This feedback may enable the transmitting node to stop transmitting coded packets for the present generation and to move on to a next generation. Among other benefits, this feedback may provide a reduction in energy consumption to be achieved within the inter-session coding region.

In some embodiments, aspects and features described herein are implemented, at least in part, as computer instructions and/or data structures stored on a non-transitory machine-readable (e.g., computer readable) medium or media. Any type of non-transitory machine-readable medium may be used including, for example, floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of non-transitory media suitable for storing electronic instructions and/or data. As used herein, the terms "non-transitory machine-readable media," "non-transitory computer-readable media," and the like are not intended to encompass transitory signals per se (i.e., signals acting as a medium or media). However, these terms are not intended to exclude physical media such as volatile memory or RAM, where the data or instructions stored thereon is only temporarily stored, or stored in "transitory" fashion.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine implemented method for use in a wireless network having a plurality of wireless nodes, comprising:
determining routes through the wireless network for different unicast sessions; analyzing routes in the wireless network for the different unicast sessions to identify one or more inter-session coding regions in the network, each inter-session coding region including at least one wireless relay node that is associated with multiple unicast sessions;
combining network coded packets associated with multiple unicast sessions within the wireless relay nodes of the inter-session coding regions includes exclusive-ORing (XORing) random linear network coded (RLNC) packets associated with different unicast sessions and transmitting the resulting combined packets from the wireless relay nodes to other nodes within the corresponding inter-session coding regions, wherein combining the network coded packets associated with multiple unicast sessions includes coding through linear combinations over a finite field; and
within a first node of a first inter-session coding region:
over hearing and storing transmissions of other nodes within the first inter-session coding region that are associated with different unicast sessions than the first node;
receiving and storing combined network coded packets received from a first relay node of the first inter-session coding region;
jointly using combined network coded packets and overheard transmissions stored in the first node to generate a coded packet that is associated with a single specific unicast session; and
transmitting the coded packet that is associated with the single unicast session from the first node to a node outside the first inter-session coding region; wherein:
combining network coded packets associated with multiple unicast sessions within the wireless relay nodes of the inter-session coding regions includes, for the first relay node of the first inter-session coding region:
determining whether a new RLNC packet has been received by the first relay node for each of a plurality of unicast sessions associated with the first relay node;
if new RLNC packets have been received by the first relay node for each of the plurality of unicast sessions, XORing the new RLNC packets together; and
if a new RLNC packet has not been received by the first relay node for one of the plurality of unicast sessions, generating an RLNC packet for the unicast session using data from a local buffer and then XORing the new RLNC packet(s) with the generated RLNC packet.

2. A machine implemented method for use in a wireless network having a plurality of wireless nodes, the method comprising:
determining routes through the wireless network for different unicast sessions;
analyzing routes in the wireless network for the different unicast sessions to identify one or more inter-session coding regions in the network, each inter-session coding region including at least one wireless relay node that is associated with multiple unicast sessions;
combining network coded packets associated with multiple unicast sessions within the wireless relay nodes of the inter-session coding regions and transmitting the resulting combined packets from the wireless relay nodes to other nodes within the corresponding inter-session coding regions, wherein each unicast session in the network has an associated network coding generation size indicative of the number of data packets that are combined together in each network coded packet of the unicast session and wherein combining the network coded packets associated with multiple unicast sessions includes coding through linear combinations over a finite field;
within a first node of a first inter-session coding region:
over hearing and storing transmissions of other nodes within the first inter-session coding region that are associated with different unicast sessions than the first node;
receiving and storing combined network coded packets received from a first relay node of the first inter-session coding region;
jointly using combined network coded packets and overheard transmissions stored in the first node to generate a coded packet that is associated with a single specific unicast session; and
transmitting the coded packet that is associated with the single unicast session from the first node to a node outside the first inter-session coding region; and
sending a feedback message from a relay node of an inter-session coding region of the network to an upstream node transmitting network coded packets associated with a first unicast session to the relay node in response to receipt of a sufficient number of degrees of freedom from the upstream node to enable reliable decoding of a present generation of the first unicast session; and
ceasing transmission of network coded packets associated with the current generation of the first unicast session from the upstream node in response to the feedback message.

3. The method of claim 2, wherein:
determining routes through the wireless network for different unicast sessions is performed without coordination between the unicast sessions.

4. The method of claim 2, further comprising:
combining network coded packets associated with the same unicast session within wireless nodes both inside and outside of the inter-session coding regions and transmitting the resulting combined packets to other nodes in the network.

5. The method of claim 2, wherein:
combining network coded packets associated with multiple unicast sessions within the wireless relay nodes of the inter-session coding regions includes exclusive-ORing (XORing) random linear network coded (RLNC) packets associated with different unicast sessions.

6. The method of claim 2, wherein:
using combined network coded packets received from the first relay node of the first inter-session coding region and overheard transmissions stored in the first node to generate a coded packet that is associated with a single unicast session includes performing partial decoding of a combined network coded packet to remove effects of all unicast sessions other than the single specific unicast session.

7. The method of claim 2, wherein:
the wireless network is a wireless mesh network.

8. The method of claim 2, further comprising:
re-coding the coded packet associated with the single unicast session before transmitting the coded packet from the first node to a node outside the first inter-session coding region.

9. The method of claim 2, wherein:
determining routes through the wireless network for different unicast sessions includes identifying either a single path or multiple paths through the wireless network for each unicast session.

10. The method of claim 2, further comprising:
coordinating coding activities between different inter-session coding regions that are associated with the same unicast sessions.

11. A machine implemented method for use in a wireless network having a plurality of wireless nodes, the wireless network being capable of supporting multiple simultaneous unicast sessions, the method comprising:
defining a first inter-session coding region in the wireless network that includes a first relay node and a plurality of other nodes in a vicinity of the first relay node, the first relay node being associated with at least two different unicast sessions;
receiving new network coded packets at the first relay node for each of the at least two unicast sessions;
combining the new network coded packets using an exclusive-OR (XOR) operation to generate a combined packet in the first relay node;
transmitting the combined packet from the first relay node to at least one other node within the first inter-session coding region;
repeating receiving, combining, and transmitting at the first relay node for a number of iterations; and
if a new network coded packet is not received at the first relay node for one or more of the at least two unicast sessions during receiving for an iteration, generating a network coded packet for the corresponding unicast session(s) using data from a local buffer within the first relay node before combining;
wherein an inter-session coding region is a region of a wireless network that allows inter-session packet combinations within the coding region, but nodes within the inter-session coding region cannot transmit inter-session packet combinations to nodes outside the coding region.

12. The method of claim 11, wherein:
defining a first inter-session coding region in the wireless network includes defining a region having one of the following topologies: an X topology, a cross topology, and an Alice and Bob topology.

13. The method of claim 11, further comprising:
transmitting a feedback message from the first relay node to an upstream transmitting node associated with a first unicast session if a sufficient number of degrees of freedom have been received at the first relay node to reliably decode a current generation of the first unicast session.

14. The method of claim 11, further comprising:
coordinating coding activities in the first inter-session coding region and another inter-session coding region in the wireless network from the first relay node.

15. The method of claim 11, wherein:
combining the new network coded packets using an XOR operation to generate a combined packet in the first relay node includes combining random linear network coded (RLNC) packets.

16. A machine implemented method for use in a wireless network having a plurality of wireless nodes, the wireless network having one or more inter-session coding regions defined around relay nodes at which routes associated with different unicast sessions intersect, the method comprising:
at a first node of a first inter-session coding region:
overhearing and storing transmissions of other nodes within the first inter-session coding region that are associated with different unicast sessions than the first node;
receiving and storing combined packets from a relay node of the first inter-session coding region at the first node, the combined packets each including a linear combination over a finite field of network coded packets associated with multiple different unicast sessions;
jointly using the combined packets and overheard transmissions stored in the first node to generate a network coded packet that is associated with a single specific unicast session; and
transmitting the network coded packet that is associated with the single unicast session from the first node to a node outside the first inter-session coding region; and
wherein the combined packets received from the relay node of the first inter-session coding region include a combination of random linear network coding (RLNC) packets associated with different unicast sessions that are exclusive ORed (XORed) together.

17. A communication device for use in a wireless mesh network, the communication device comprising:
a wireless transceiver;
digital storage;
circuitry configured to analyze routes associated with different unicast sessions within the wireless mesh network and establish at least one inter-session coding region within the wireless mesh network within which combinations of network coded packets associated with different unicast sessions are permitted, each inter-session coding region including at least one relay node that is associated with multiple unicast sessions in the network and a plurality of other nodes in a vicinity of the at least one relay node, wherein combinations of network coded packets associated with different unicast sessions are not permitted in portions of the wireless mesh network outside of inter-session coding regions;
circuitry configured to, if the communication device is acting as a non-relay node within an inter-session coding region, overhear and store transmissions of other non-relay nodes within the inter-session coding region;
circuitry configured to, if the communication device is acting as a non-relay node within an inter-session coding region, receive and store combined packets from a relay node of the inter-session coding region, the combined packets including linear combinations over a finite field of network coded packets associated with different unicast sessions;
circuitry configured to, if the communication device is acting as a non-relay node within an inter-session coding region, jointly process combined packets and overheard transmissions stored in the communication device to generate network coded packets associated with only a single unicast session, wherein the communication device only transmits packets that are associated with a single unicast session to nodes outside of the inter-session coding region;

circuitry configured to, if the communication device is acting as a relay node within an inter-session coding region, receive random linear network coded (RLNC) packets associated with different unicast sessions from other nodes within the inter-session coding region, combine the RLNC packets using an exclusive OR (XOR) operation, and transmit the combined packet to another node of the inter-session coding region; and circuitry configured to, if the communication device is acting as a relay node within an inter-session coding region and if a new random linear network coded (RLNC) packet is not received for one or more of the different unicast sessions, generate an RLNC packet for the unicast session(s) using data stored locally within the communication device before the RLNC packets are combined.

18. A communication device for use in a wireless mesh network, the communication device comprising:

a wireless transceiver;

digital storage;

circuitry configured to analyze routes associated with different unicast sessions within the wireless mesh network and establish at least one inter-session coding region within the wireless mesh network within which combinations of network coded packets associated with different unicast sessions are permitted, each inter-session coding region including at least one relay node that is associated with multiple unicast sessions in the network and a plurality of other nodes in a vicinity of the at least one relay node, wherein combinations of network coded packets associated with different unicast sessions are not permitted in portions of the wireless mesh network outside of inter-session coding regions;

circuitry configured to, if the communication device is acting as a non-relay node within an inter-session coding region, overhear and store transmissions of other non-relay nodes within the inter-session coding region;

circuitry configured to, if the communication device is acting as a non-relay node within an inter-session coding region, receive and store combined packets from a relay node of the inter-session coding region, the combined packets including linear combinations over a finite field of network coded packets associated with different unicast sessions;

circuitry configured to, if the communication device is acting as a non-relay node within an inter-session coding region, jointly process combined packets and overheard transmissions stored in the communication device to generate network coded packets associated with only a single unicast session, wherein the communication device only transmits packets that are associated with a single unicast session to nodes outside of the inter-session coding region; and circuitry configured to, when the communication device is acting as a relay node within an inter-session coding region, send a feedback message to an upstream transmitting node associated with a first unicast session when a sufficient number of degrees of freedom have been received from the upstream node to decode a current RLNC generation.

19. The communication device of claim 18, further comprising:

circuitry configured to, if the communication device is acting as a relay node within an inter-session coding region, receive random linear network coded (RLNC) packets associated with different unicast sessions from other nodes within the inter-session coding region, combine the RLNC packets using an exclusive OR (XOR) operation, and transmit the combined packet to another node of the inter-session coding region.

20. The communication device of claim 18, further comprising:

circuitry configured to, if the communication device is acting as a non-relay node within an inter-session coding region, jointly process combined packets and overheard transmissions stored in the communication device to generate network coded packets associated with only a single unicast session, wherein jointly processing combined packets includes performing partial decoding of a combined network coded packet to remove effects of all unicast sessions other than the single specific unicast session.

21. The communication device of claim 18, further comprising:

circuitry configured to, if the communication device is acting as a relay node within an inter-session coding region and if a new random linear network coded (RLNC) packet is not received for one or more of the different unicast sessions, generate an RLNC packet for the unicast session(s) using data stored locally within the communication device before the RLNC packets are combined.

22. The communication device of claim 18, further comprising:

circuitry configured to, if the communication device is acting as a non-relay node within an inter-session coding region, re-code the coded packet associated with the single unicast session before transmitting the coded packet from the communication device to at least one node outside the inter-session coding region.

23. A machine implemented method for use in a wireless network having a plurality of wireless nodes, comprising:

determining routes through the wireless network for different unicast sessions;

analyzing routes in the wireless network for the different unicast sessions to identify one or more inter-session coding regions in the network, each inter-session coding region including at least one wireless relay node that is associated with multiple unicast sessions;

combining network coded packets associated with multiple unicast sessions within the wireless relay nodes of the inter-session coding regions and transmitting the resulting combined packets from the wireless relay nodes to other nodes within the corresponding inter-session coding regions, wherein combining the network coded packets associated with multiple unicast sessions includes coding through linear combinations over a finite field; and within a first node of a first inter-session coding region:

over hearing and storing transmissions of other nodes within the first inter-session coding region that are associated with different unicast sessions than the first node;

receiving and storing combined network coded packets received from a first relay node of the first inter-session coding region;

jointly using combined network coded packets and overheard transmissions stored in the first node to generate a coded packet that is associated with a single specific unicast session; and transmitting the coded packet that is associated with the single unicast session from the first node to a node outside the first inter-session coding region;

and wherein:

performing partial decoding of a combined network coded packet to remove effects of all unicast sessions other than the single specific unicast session includes performing partial decoding using a matrix of network coding coefficients; and using combined network coded packets received from the first relay node of the first inter-session coding region and overheard transmissions stored in the first node to generate a coded packet that is associated with a single unicast session includes performing partial decoding of a combined network coded packet to remove effects of all unicast sessions other than the single specific unicast session.

24. A machine implemented method for use in a wireless network having a plurality of wireless nodes, the wireless network having one or more inter-session coding regions defined around relay nodes at which routes associated with different unicast sessions intersect, the method comprising:

at a first node of a first inter-session coding region:

overhearing and storing transmissions of other nodes within the first inter-session coding region that are associated with different unicast sessions than the first node;

receiving and storing combined packets from a relay node of the first inter-session coding region at the first node, the combined packets each including a linear combination over a finite field of network coded packets associated with multiple different unicast sessions;

jointly using the combined packets and overheard transmissions stored in the first node to generate a network coded packet that is associated with a single specific unicast session; and transmitting the network coded packet that is associated with the single unicast session from the first node to a node outside the first inter-session coding region;

and wherein using the combined packets and overheard transmissions stored in the first node to generate a coded packet that is associated with a single specific unicast session includes performing partial decoding, using a matrix of network coding coefficients, of a combined coded packet to remove effects of all unicast sessions other than the single specific unicast session.

25. The method of claim 24, wherein no inter-session coded packets are transmitted from nodes within the first inter-session coding region to nodes outside the first inter-session coding region in the wireless network.

26. The method of claim 24, further comprising:

re-coding the network coded packet associated with the single unicast session before transmitting the network coded packet from the first node to the node outside the first inter-session coding region.

* * * * *